(12) United States Patent
Kim

(10) Patent No.: US 10,805,048 B2
(45) Date of Patent: Oct. 13, 2020

(54) METHOD AND APPARATUS FOR TRANSMITTING AND RECEIVING DUPLICATE PACKETS IN NEXT-GENERATION MOBILE COMMUNICATION SYSTEM

(71) Applicant: Samsung Electronics Co., Ltd., Suwon-si, Gyeonggi-do (KR)

(72) Inventor: Donggun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/998,505

(22) Filed: Aug. 16, 2018

(65) Prior Publication Data

US 2019/0058550 A1    Feb. 21, 2019

(30) Foreign Application Priority Data

Aug. 16, 2017    (KR) .................. 10-2017-0103775
Jan. 19, 2018    (KR) .................. 10-2018-0007382

(51) Int. Cl.
     *H04L 1/08*      (2006.01)
     *H04L 1/18*      (2006.01)
     *H04L 29/08*      (2006.01)

(52) U.S. Cl.
     CPC ............ *H04L 1/08* (2013.01); *H04L 1/187* (2013.01); *H04L 1/189* (2013.01); *H04L 1/1825* (2013.01); *H04L 1/1864* (2013.01); *H04L 69/324* (2013.01)

(58) Field of Classification Search
     CPC ........ H04L 1/08; H04L 1/1864; H04L 69/324
     See application file for complete search history.

(56) References Cited

U.S. PATENT DOCUMENTS 10,212,728 B2 * 2/2019 Lee ..................... H04W 80/02
10,582,418 B2 * 3/2020 Tsai .................... H04L 69/322
(Continued)

FOREIGN PATENT DOCUMENTS

WO    2015/005741 A1    1/2015

OTHER PUBLICATIONS

CATT, 'Impact of PDCP duplication on RLC', R2-1706376, 3GPP TSG-RAN WG2 Meeting #NR AH2, Jun. 17, 2017, Qingdao, China, See section 2.1.1; and figure 2.
(Continued)

*Primary Examiner* — Rasheed Gidado
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) is provided. The method includes intelligent services based on the 5G communication technology and the IoT-related technology, such as smart home, smart building, smart city, smart car, connected car, health care, digital education, smart retail, security and safety services.
The disclosure provides a packet processing method of a transmitter that include transmitting a radio link control (RLC) service data unit (SDU) to a receiver; receiving, from the receiver, a first message including information about whether the RLC SDU is successfully transmitted; and transmitting a first indicator indicating successful transmission of the RLC SDU from an RLC entity of the transmitter to a packet data convergence protocol (PDCP) entity of the transmitter when the receiver receives the RLC SDU.

10 Claims, 17 Drawing Sheets

(56) References Cited

U.S. PATENT DOCUMENTS

| | | | | |
|---|---|---|---|---|
| 2002/0094814 | A1* | 7/2002 | Wigell | H04W 36/18 |
| | | | | 455/436 |
| 2007/0110101 | A1* | 5/2007 | Wu | H04L 1/1874 |
| | | | | 370/469 |
| 2012/0140704 | A1* | 6/2012 | Zhao | H04L 1/1874 |
| | | | | 370/315 |
| 2015/0023370 | A1* | 1/2015 | Sammour | H04L 1/1874 |
| | | | | 370/465 |
| 2016/0113058 | A1* | 4/2016 | Jung | H04B 7/2612 |
| | | | | 370/328 |
| 2016/0183158 | A1* | 6/2016 | Decarreau | H04W 36/02 |
| | | | | 370/328 |
| 2016/0277154 | A1* | 9/2016 | Quan | H04L 47/34 |
| 2016/0286412 | A1 | 9/2016 | Kim et al. | |
| 2018/0309660 | A1* | 10/2018 | Loehr | H04W 36/0066 |
| 2018/0352556 | A1* | 12/2018 | Loehr | H04L 47/30 |
| 2019/0053325 | A1* | 2/2019 | Yu | H04W 76/28 |

OTHER PUBLICATIONS

Oppo, 'Impact of duplication on RLC', R2-1707771, 3GPP TSG-RAN WG2 #99, Aug. 11, 2017, Berlin, Germany, See section 2.1; and figure 1.

Huawei et al., 'RLC optimization for packet duplication', R2-1709498, 3GPP TSG-RAN WG2 #99, Aug. 12, 2017, Berlin, Germany, See section 2.

International Search Report dated Nov. 6, 2018, issued in International Application No. PCT/KR2018/009422.

Huawei et al: "PDCP, operation for packet duplication", 3GPP Draft; R2-1706483, PDCP Operation for packet duplication, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 26, 2017 (Jun. 26, 2017), XP051300989, Retrieved from the Internet URL:http://www.3gpp.org/ftp/Meetings_3GPP_SYNC/RAN2/Docs/.

Nokia et al: "Duplication Imapcts to PDCP", 3GPP Draft; R2-1704276 Duplication Impacts to PDCP, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017 (May 14, 2017), XP051274854, Retrieved from the Internet: URL:http://www.3gpp.org/ftp/Meetings_3GPP_SYNC/RAN2/Docs/.

Catt: "PDCP and RLC enchancements in support of duplication", 3GPP Draft; R2-1704249, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017 (May 14, 2017) XP051274827, Retrieved from the Internet: URL:http://www.3gpp.org/ftp/Meetings_3GPP SYNC/RAN2/Docs/.

Extended European Search Report dated May 26, 2020, issued in European Application No. 18846393.9.

* cited by examiner

FIG. 1M

| PDCP SN | RLC SN1 | RLC SN2 | ACK/NACK |
|---|---|---|---|
| 2 | 7 | 0 | O |
| 3 | 8 |  | O |
| 4 | 9 |  | O |
| 5 | 10 | 3 | O |
| 6 |  |  | X |
| 7 | 12 | 5 | O |

PDCP SN : 2, 3, 4, 5, 6, 7, ...

RLC SN1 : 7, 8, 9, 10, 11, 12, ...

RLC SN2 : 0, 1, 2, 3, 4, 5, ...

METHOD AND APPARATUS FOR TRANSMITTING AND RECEIVING DUPLICATE PACKETS IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application numbers 10-2017-0103775, filed on Aug. 16, 2017, and 10-2018-0007382, filed on Jan. 19, 2018, in the Korean Intellectual Property Office, the disclosure of which is incorporated herein its entirety.

BACKGROUND

1. Field

The disclosure relates to a method for a transmitting apparatus to efficiently transmit duplicate packets in a next-generation mobile communication system and a method for a receiving apparatus to efficiently receive duplicate packets in a next-generation mobile communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities exchange and process information without human intervention. The internet of everything (IoE), which is a combination of the IoT technology and the big data processing technology (BDPT) through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described BDPT may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for a next-generation mobile communication system, to transmit the same data through different independent paths using carrier aggregation or dual connectivity in order to increase reliability and to reduce a transmission delay. When each radio link control (RLC) entity supporting packet duplication operates in the RLC acknowledged mode (AM), each RLC entity can perform an independent ARQ function and thus may request unnecessary retransmission. That is, when data successfully transmitted via a first link is lost in a second link, a receiving RLC entity corresponding to the second link requests retransmission of the lost data, causing a transmission delay and unnecessary retransmission, thereby wasting transmission resources.

In accordance with an aspect of the disclosure, a method and an apparatus is provided. The apparatus includes a method for reducing unnecessary retransmission, waste of transmission resources, and a transmission delay.

In accordance with an aspect of the disclosure, a packet processing method of a transmitter is provided. The method includes transmitting, via the transmitter, an RLC service data unit (SDU) to a receiver; receiving, from the receiver, a first message including information about whether the RLC SDU is successfully transmitted, and transmitting, via the transmitter, a first indicator indicating successful transmission of the RLC SDU from an RLC entity of the transmitter to a packet data convergence protocol (PDCP) entity of the transmitter when the receiver receives the RLC SDU.

In accordance with an aspect of the disclosure, an apparatus for transmitter is provided. The apparatus includes a transceiver; and a controller configured to: control the transceiver to transmit an RLC SDU to a receiver, control the transceiver to receive, from the receiver, a first message including information about whether the RLC SDU is successfully transmitted, and control the transceiver to transmit a first indicator indicating successful transmission of the RLC SDU from an RLC entity to a PDCP entity of the transmitter when the receiver receives the RLC SDU.

The disclosure proposes the operations of a transmitting apparatus and a receiving apparatus for efficiently using packet duplication applicable to a next-generation mobile communication system, thereby reducing unnecessary retransmission, waste of transmission resources, and a transmission delay.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from to the following description taken in conjunction with the accompanying drawings, in which:

FIG. 1M illustrates a mapping table applied in a second embodiment of efficient receiving RLC-layer entities of the disclosure for preventing unnecessary retransmission and waste of transmission resources and reducing a transmission delay in packet duplication of a next-generation mobile communication system according to an embodiment of the disclosure;

FIG. 1O illustrates the operation of a receiving RLC-layer entity according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

As used in the following description, a term for identifying an access node, terms referring to network entities, terms referring to messages, a term referring to an interface between network objects, and terms referring to various identification information are illustrated for convenience of explanation. Therefore, the disclosure is not limited by the following terms, and other terms referring to objects having equivalent technical meanings may be used.

For convenience of explanation, the disclosure uses terms and words defined in the third generation partnership project long term evolution (3GPP LTE) standard. However, the disclosure is not limited by these terms and words and may be equally applied to systems in accordance with other standards. In the disclosure, eNB may be used interchangeably with gNB for convenience of explanation. That is, an eNB illustrated as a base station may refer to a gNB.

Figure 1A:
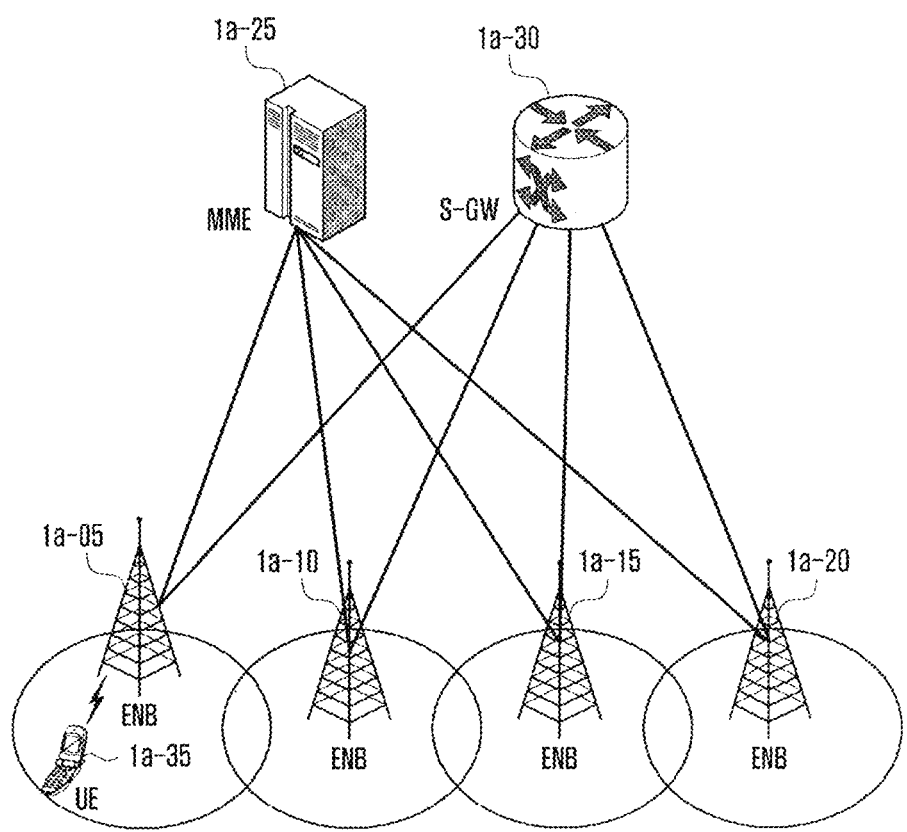
FIG. 1A illustrates the structure of an LTE system according to an embodiment of the disclosure.

FIG. 1A illustrates the structure of an LTE system according to the disclosure.

Referring to FIG. 1A, a radio access network of the LTE system includes an Evolved Node B (an eNB, a Node B or a base station) 1a-05, 1a-10, 1a-15, or 1a-20, a mobility management entity (MME) 1a-25, and a serving gateway (S-GW) 1a-30. User equipment (UE) or terminal 1a-35 accesses an external network through the eNBs 1a-05 to 1a-20 and the S-GW 1a-30.

In FIG. 1A, the eNBs 1a-05 to 1a-20 correspond to an existing node B of a UMTS system. The eNB is connected to the UE 1a-35 over a wireless channel and performs a more complex role than that of the existing Node B. In the LTE system, since all user traffic including a real-time service, such as a voice over Internet protocol (VoIP) service, is provided through a shared channel, a device that collects state information, such as UEs' buffer status, available transmission power state, and channel state, and performs scheduling is required. The eNBs 1a-05 to 1a-20 are responsible for these functions. One eNB generally controls a plurality of cells. For example, in order to realize a transmission speed of 100 Mbps, the LTE system uses orthogonal frequency division multiplexing (OFDM) as a radio access technology, for example, at a bandwidth of 20 MHz. In addition, the LTE system applies adaptive modulation & coding (AMC), which determines a modulation scheme and a channel coding rate according to the channel state of a UE. The S-GW 1a-30 is a device that provides a data bearer and generates or removes a data bearer under the control of the MME 1a-25. The MME is a device that performs not only a mobility management function for a UE but also various control functions and is connected to a plurality of base stations.

Figure 1B:
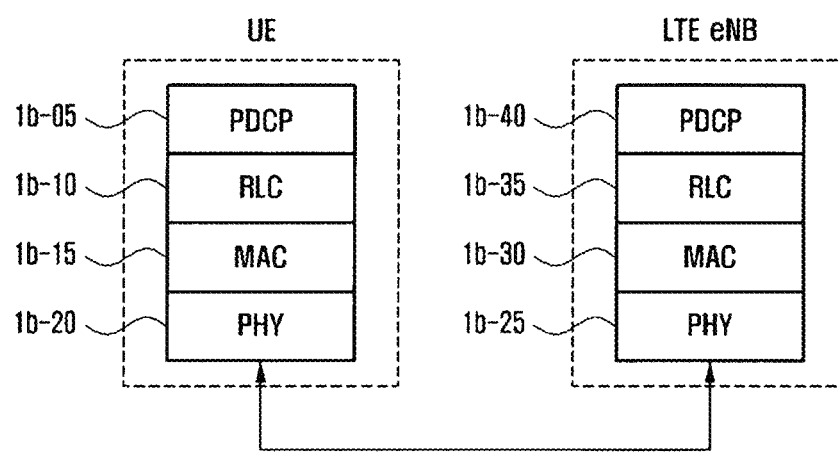
FIG. 1B illustrates the wireless protocol structure of an LTE system according to an embodiment of the disclosure.

FIG. 1B illustrates a wireless protocol structure of an LTE system according to the disclosure.

Referring to FIG. 1B, a wireless protocol of the LTE system includes packet data convergence protocols (PDCPs) 1b-05 and 1b-40, radio link controls (RLCs) 1b-10 and 1b-35, and medium access controls (MACs) 1b-15 and 1b-30 respectively at a UE and an eNB.

The PDCPs 1b-05 and 1b-40 are responsible for IP header compression/decompression or the like. Main functions of the PDCPs are summarized as follows:
  Header compression and decompression (ROHC only)
  Transfer of user data
  In-sequence delivery of upper-layer PDUs at PDCP re-establishment procedure for RLC AM
  For split bearers in DC (only support for RLC AM), PDCP PDU routing for transmission and PDCP PDU reordering for reception
  Duplicate detection of lower-layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The RLCs 1b-10 and 1b-35 reconstruct a PDCP packet data unit (PDU) into a proper size and perform an ARQ operation. Main functions of the RLCs are summarized as follows:
  Transfer of upper-layer PDUs
  Error Correction through ARQ (only for AM data transfer)
  Concatenation, segmentation, and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MACs 1b-15 and 1b-30 are connected to a plurality of RLC-layer entities configured in one UE, multiplex RLC PDUs into an MAC PDU, and demultiplex an MAC PDU into RLC PDUs. Main functions of the MACs are summarized as follows:
  Mapping between logical channels and transport channels
  Multiplexing/demultiplexing of MAC SDUs belonging to one or different logical channels into/from transport blocks (TBs) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding Physical (PHY) layers 1b-20 and 1b-25 perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Figure 1C:
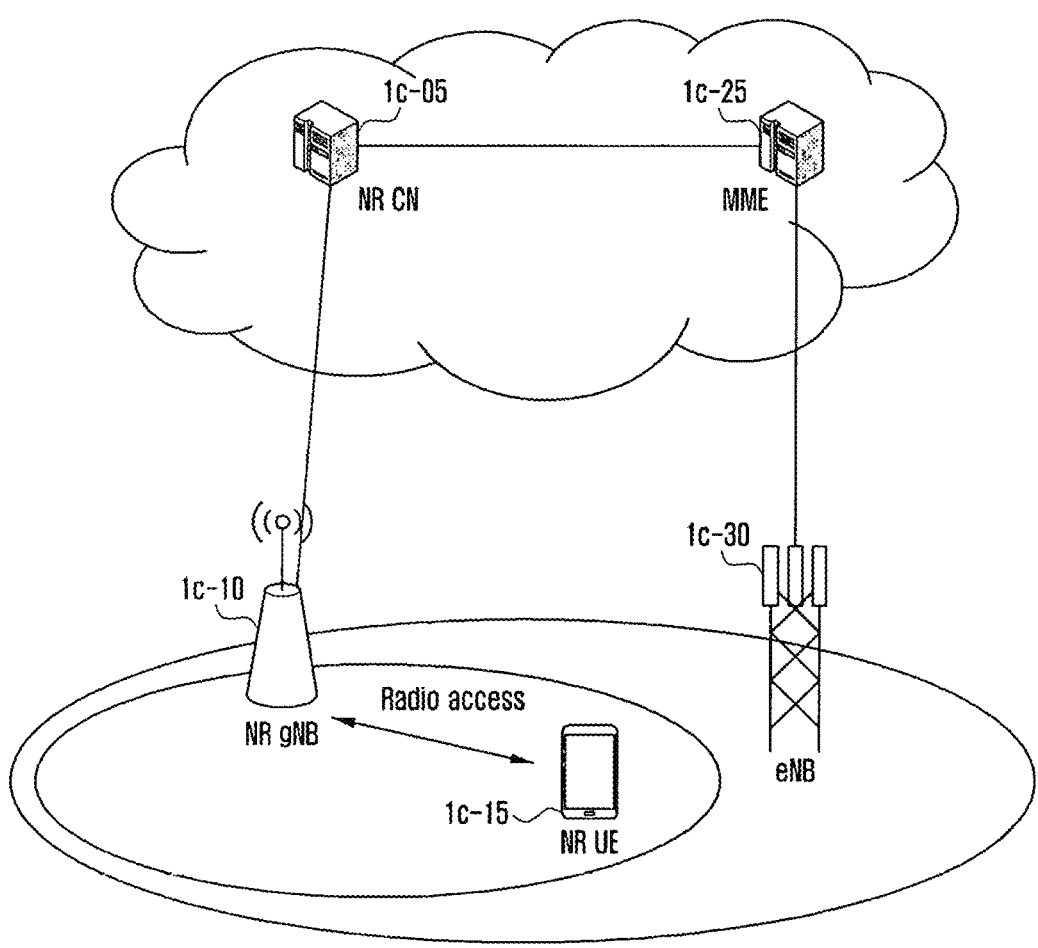
FIG. 1C illustrates the structure of a next-generation mobile communication system according to an embodiment of the disclosure.

FIG. 1C illustrates a structure of a next-generation mobile communication system according to the disclosure.

Referring to FIG. 1C, a radio access network of the next-generation mobile communication system (hereinafter, referred to as NR or 5G) includes a new radio node B (NR gNB) or NR base station 1c-10 and a new radio core network (NR CN) 1c-05. A new radio user equipment (NR UE or terminal 1c-15 accesses an external network through the NR gNB 1c-10 and the NR CN 1c-05.

In FIG. 1C, the NR gNB 1c-10 corresponds to an evolved node B (eNB) of an existing LTE system. The NR gNB is connected to the NR UE 1c-15 over a wireless channel and may provide a more advanced service than that of the existing eNB. In the next-generation mobile communication system, since all user traffic is served through a shared channel, a device that collects state information, such as UEs' buffer status, available transmission power state, and channel state, and performs scheduling is required. The NR gNB 1c-10 is responsible for these functions. One NR gNB generally controls a plurality of cells. In order to realize ultrahigh-speed data transmission compared to current LTE, the NR may have a bandwidth greater than the existing maximum bandwidth and may employ a beamforming technique in addition to OFDM as a radio access technology. Further, the NR applies AMC, which determines a modulation scheme and a channel coding rate according to the channel state of a UE.

The NR CN 1c-05 performs functions of mobility support, bearer setup, and QoS setup. The NR CN is a device that performs not only a mobility management function for a UE but also various control functions and is connected to a plurality of base stations. The next-generation mobile communication system may also interwork with the existing LTE system, in which case the NR CN is connected to an MME 1c-25 through a network interface. The MME is connected to the eNB 1c-30, which is an existing base station.

Figure 1D:
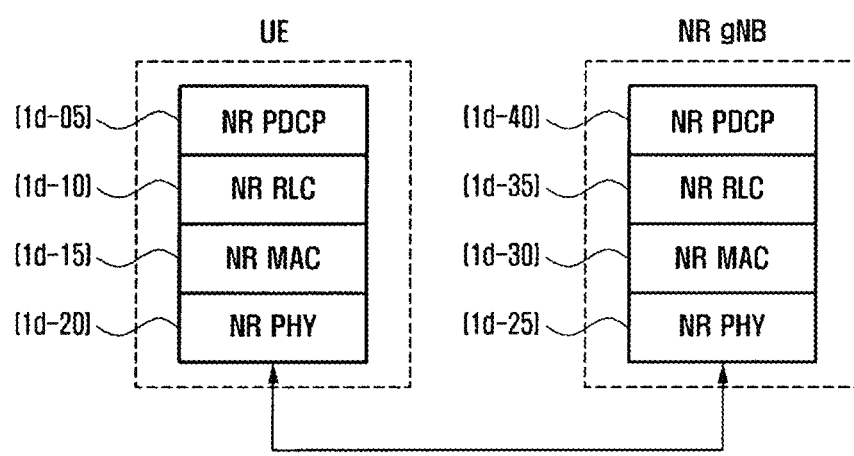
FIG. 1D illustrates the wireless protocol structure of a next-generation mobile communication system according to an embodiment of the disclosure.

FIG. 1D illustrates the wireless protocol structure of a next-generation mobile communication system according to the disclosure.

Referring to FIG. 1D, a wireless protocol of the next-generation mobile communication system includes NR PDCPs 1d-05 and 1d-40, NR RLCs 1d-10 and 1d-35, and NR MACs 1d-15 and 1d-, 1d-30) respectively at a UE and an NR base station.

Main functions of the NR PDCPs 1d-05 and 1d-40 may include some of the following functions:
- Header compression and decompression (ROHC only)
- Transfer of user data
- In-sequence delivery of upper-layer PDUs
- Out-of-sequence delivery of upper-layer PDUs
- PDCP PDU reordering for reception
- Duplicate detection of lower-layer SDUs
- Retransmission of PDCP SDUs
- Ciphering and deciphering
- Timer-based SDU discard in uplink.

Among the above functions, the reordering function of the NR PDCP entities refers to a function of rearranging PDCP PDUs received in a lower layer in order on the basis of the PDCP sequence number (SN) and may include a function of transmitting the data to an upper layer in the order of rearrangement or a function of immediately transmitting the data regardless of order. In addition, the reordering function of the NR PDCP entities may include a function of recording lost PDCP PDUs via reordering, may include a function of reporting the state of lost PDCP PDUs to a transmitter, and may include a function of requesting retransmission of lost PDCP PDUs. Main functions of the NR RLCs 1d-10 and 1d-35 may include some of the following functions:
- Transfer of upper-layer PDUs
- Ii-sequence delivery of upper-layer PDUs
- Out-of-sequence delivery of upper-layer PDUs
- Error Correction through ARQ
- Concatenation, segmentation, and reassembly of RLC SDUs
- Re-segmentation of RLC data PDUs
- Reordering of RLC data PDUs
- Duplicate detection
- Protocol error detection
- RLC SDU discard
- RLC re-establishment Among the above functions, the in-sequence delivery function of the NR RLC entities refers to a function of delivering RLC SDUs received from a lower layer to an upper layer in order, and may include a function of reassembling and delivering a plurality of RLC SDUs when one original RLC SDU is divided into the plurality of RLC SDUs to be received. In addition, the in-sequence delivery function of the NR RLC entities may include a function of rearranging received RLC PDUs on the basis of the RLC SN or the PDCP SN and may include a function of recording lost RLC PDUs via reordering. In addition, the in-sequence delivery function of the NR RLC entities may include a function of reporting the state of lost RLC PDUs to a transmitter, may include a function of requesting retransmission of lost RLC PDUs, and, if there is a lost RLC SDU, may include a function of delivering only RLC SDUs before the lost RLC SDU to an upper layer in order. The in-sequence delivery function of the NR RLC entities may include a function of delivering all RLC SDUs, received before a timer starts, to an upper layer in order when the timer has expired despite the presence of a lost RLC SDU, or may include a function of delivering all RLC SDUs received so far to an upper layer in order when the timer expires despite the presence of a lost RLC SDU.

The NR RLC entities may process RLC PDUs in order of reception (the order of arrival regardless of the order of SNs) and may deliver the RLC PDUs to the PDCP entities in an out-of-sequence manner. For a segment, the NR RLC entities may receive segments that are stored in a buffer or are to be received later, may reconstruct the segment into one whole RLC PDU, may process the RLC PDU, and may deliver the RLC PDU to the PDCP entities. The NR RLC layers may not include a concatenation function, and the concatenation function may be performed in the NR MAC layers or may be replaced with a multiplexing function of the NR MAC layers.

The out-of-sequence delivery function of the NR RLC entities refers to a function of delivering RLC SDUs received from a lower layer directly to an upper layer regardless of order, and may include a function of reassembling and delivering a plurality of RLC SDUs when one original RLC SDU is divided into the plurality of RLC SDUs to be received. In addition, the out-of-sequence delivery function of the NR RLC entities may include a function of recording lost RLC PDUs by storing and reordering the RLC SNs or PDCP SNs of received RLC PDUs.

The NR MACs 1d-15 and 1d-30 may be connected to a plurality of NR RLC-layer entities configured in one UE. Main functions of the NR MACs may include some of the following functions:
- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding NR PHY layers 1d-20 and 1d-25 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

In the disclosure, a transmitting apparatus may be a base station or a UE, and a receiving apparatus may be a base station or a UE. The disclosure may include both a case where a transmitting apparatus is a base station and a receiving apparatus is a UE (downlink data transmission scenario) and a case where a transmitting apparatus is a UE and a receiving apparatus is a base station (uplink data transmission scenario). A transmitting apparatus may refer to a base station or a UE, and a receiving apparatus may refer to a base station or a UE.

Figure 1E:
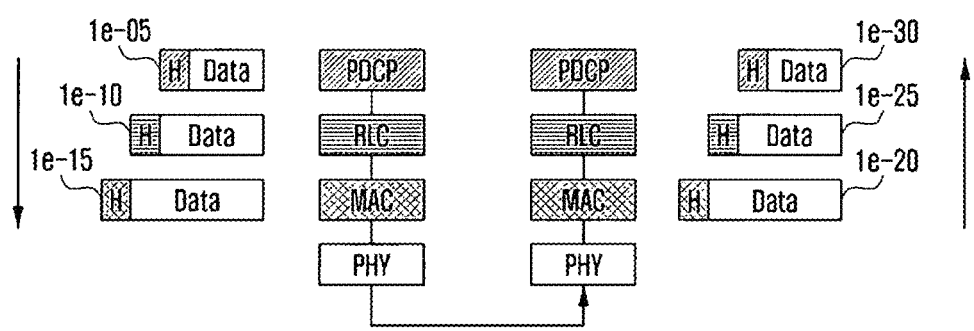
FIG. 1E illustrates a procedure in which data is processed in each layer in a next-generation mobile communication system according to an embodiment of the disclosure.

FIG. 1E illustrates a procedure in which data is processed in each layer in a next-generation mobile communication system according to an embodiment of the disclosure.

Referring to FIG. 1E, when an IP packet arrives in a PDCP-layer entity, a PDCP layer may perform an operation according to the functions of the PDCP layers described in FIG. 1D. The PDCP layer may construct a PDCP PDU 1e-05 of a PDCP header and data and may deliver the PDCP PDU to a lower layer.

An RLC layer, which is a lower layer, may recognize the entire PDCP PDU 1e-05, received from the PDCP layer, as one data, and may perform an operation according to the functions of the RLC layers described in FIG. 1D. The RLC layer forms an RLC PDU 1e-10 by constructing an RLC header and delivers the RLC PDU to a lower layer.

Upon receiving the RLC PDU 1e-10 from the RLC layer, an MAC-layer entity, which is a lower layer, may recognize the entire RLC PDU as data and may perform the functions of the MAC-layer entities described in FIG. 1D. The MAC-layer entity completes an MAC PDU 1e-15 by constructing an MAC subheader, delivers the MAC PDU to a lower layer, and transmits the MAC PDU through a PHY layer.

When a receiving MAC-layer entity of FIG. 1E receives an MAC PDU 1e-20 from a lower layer, the MAC-layer entity reads the content of an MAC header, considers the remaining data as data, and delivers the considered data to an RLC layer, which is an upper layer.

Upon receiving an RLC PDU 1e-25, the RLC layer reads only an RLC header corresponding to the RLC layer, considers the remaining data as data, and delivers the considered data to an upper layer.

Likewise, when receiving a PDCP PDU 1e-30, a PDCP layer reads only a PDCP header, performs an operation corresponding to a PDCP-layer entity, removes the PDCP header from the PDCP PDU 1e-30, and delivers the remaining data to an upper layer.

As described above, each layer of the next-generation mobile communication system can read only a header corresponding to each layer and cannot read a header or data of a different layer. Therefore, information is independently managed and processed.

Figure 1F:
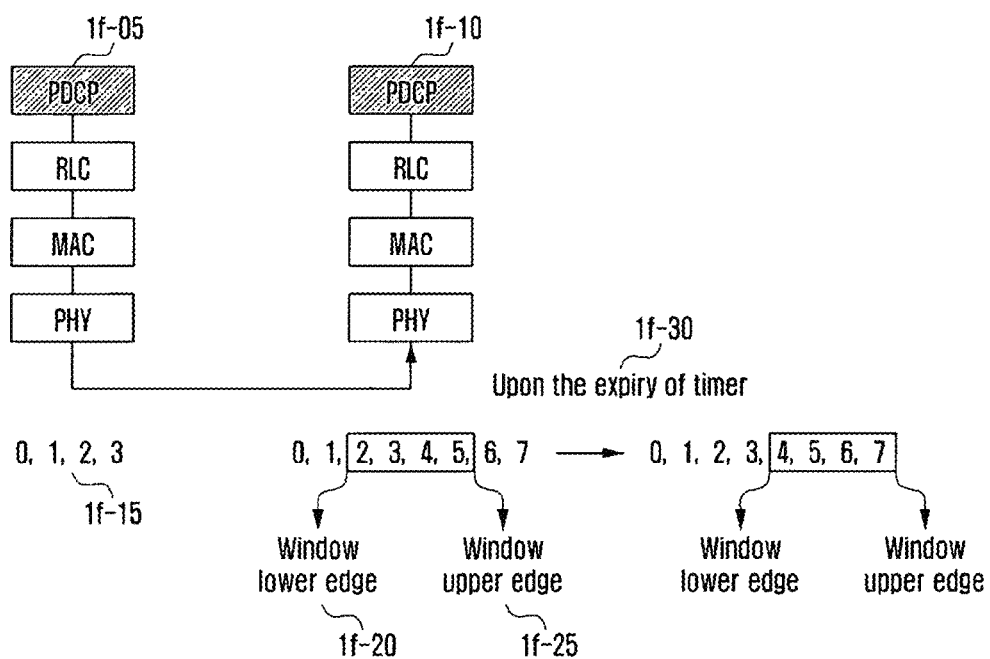
FIG. 1F illustrates a window function that operates according to a packet data convergence protocol (PDCP) sequence number (SN) in a PDCP layer of a next-generation mobile communication system according to an embodiment of the disclosure.

FIG. 1F illustrates a window function that operates according to a PDCP SN in a PDCP layer of a next-generation mobile communication system according to an embodiment of the disclosure.

Referring to FIG. 1F, a transmitting PDCP entity 1f-05 and a receiving PDCP entity 1f-10 may perform a window operation according to a PDCP SN in a PDCP header. The transmitting PDCP entity may transmit each packet by allocating a PDCP SN to the packet, and the packet allocated the PDCP SN is transmitted to a receiver via an RLC layer, an MAC layer, and a PHY layer. Upon receiving the transmitted packet, a receiving PDCP layer may read a PDCP header, may identify the PDCP SN, and may perform a window operation according to the PDCP SN.

The size of a window may be half of the size of the PDCP SN used in the transmitting PDCP entity and the receiving PDCP entity. For example, when the length of the PDCP SN is 18 bits, the size of the window may be $2^{(18-1)}=2^{17}$, and a window lower edge 1f-20 is pushed and moved depending on the received PDCP SN. When the window lower edge is moved, the size of the corresponding window is pushed, and thus a window upper edge 1f-25 is also naturally moved. The PDCP SN may start from zero. The PDCP SN may be a number ranging from 0 to $2^{17}-1$.

For example, it is assumed that the transmitting PDCP entity transmits data having PDCP SNs 0, 1, 2, and 3 and data having PDCP SN 2 is lost during transmission (1f-15).

The receiving PDCP entity has successfully received 0 and 1 in a receiving window and thus may move the window lower edge 1f-20 to 2. Since having received the data having SN 3, the receiving PDCP entity can recognize that the data having SN 2 is lost and operates a timer. The timer indicates how long the receiving PDCP entity will wait for the lost data corresponding to SN 2. When the lost packet arrives within the time when the timer is driven, the timer is stopped. When the timer is reset, the window is moved to 4. However, when the lost packet does not arrive until the timer expires and the timer expires (1f-30), the receiving PDCP entity does not wait for the lost data corresponding to SN 2 any longer, moves the window lower edge to 4, and prepares to receive new data.

Therefore, in the PDCP layer, when a PDCP SN is lost, a transmission delay equivalent to a timer value occurs.

Figure 1G:
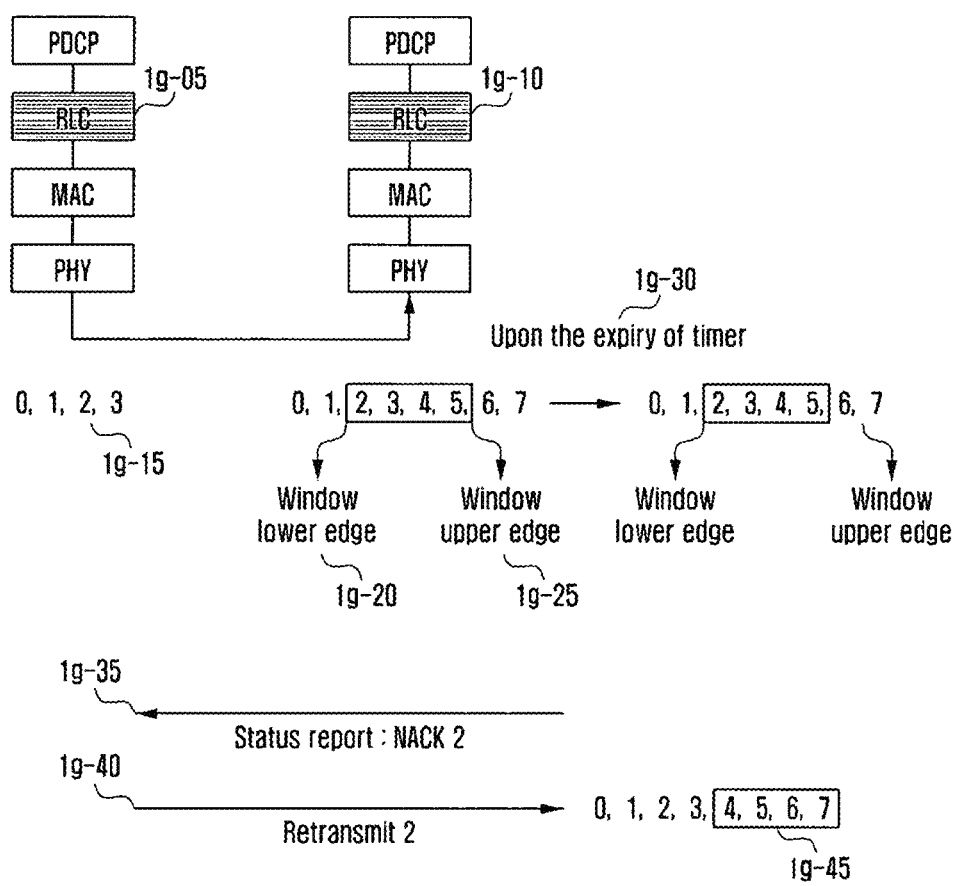
FIG. 1G illustrates a window function that operates according to a radio link control (RLC) SN in a RLC layer of a next-generation mobile communication system according to an embodiment of the disclosure.

FIG. 1G illustrates a window function that operates according to an RLC SN in an RLC layer of a next-generation mobile communication system according to an embodiment of the disclosure.

Referring to FIG. 1G, a transmitting RLC entity 1g-05 and a receiving RLC entity 1g-10 may perform a window operation according to an RLC SN in an RLC header. The RLC SN is managed separately from the PDCP SN in the PDCP header in FIGS. 1F and 1s included in the RLC header to be used for the transmitting and receiving RLC entities to operate a window.

The transmitting RLC entity may transmit each packet by allocating an RLC SN to the packet, and the packet allocated the RLC SN is transmitted to a receiver via an RLC layer, an MAC layer, and a PHY layer. Upon receiving the transmitted packet, a receiving RLC layer may read an RLC header, may identify the RLC SN, and may perform a window operation according to the RLC SN.

The size of a window may be half of the size of the RLC SN used in the transmitting RLC entity and the receiving RLC entity. For example, when the length of the RLC SN is 18 bits, the size of the window may be $2^{(18-1)}=2^{17}$, and a window lower edge 1g-20 is pushed and moved depending on the received RLC SN. When the window lower edge is moved, the size of the corresponding window is pushed, and thus a window upper edge 1g-25 is also naturally moved. The RLC SN may start from zero. The RLC SN may be a number ranging from 0 to $2^{17}-1$.

For example, it is assumed that the transmitting RLC entity transmits data having RLC SNs 0, 1, 2, and 3 and data having RLC SN 2 is lost during transmission (1g-15).

The receiving RLC entity has successfully received 0 and 1 in a receiving window and thus may move the window lower edge 1g-20 to 2. Since having received the data having SN 3, the receiving PDCP entity can recognize that the data having SN 2 is lost and operates a timer. The timer indicates how long the receiving PDCP entity will wait for the lost data corresponding to SN 2. When the lost packet arrives within the time when the timer is driven, the timer is stopped. When the timer is reset, the window is moved to 4. However, when the lost packet does not arrive until the timer expires and the timer expires (1g-30), the receiving RLC entity configures an RLC status report on the lost data corresponding to SN 2 and transmits the RLC status report to the transmitting RLC entity. The RLC status report may include a request for retransmission of the lost data corresponding to RLC SN 2 (1g-35). In this case, the receiving RLC entity cannot move the window lower edge until the data corresponding to RLC SN 2 is received (window stalling). The window can be moved only when the transmitting RLC entity retransmits the lost packet and the receiver receives the lost packet. Until the lost packet arrives, the transmitter can perform retransmission (1g-40), and the receiver can also request retransmission. When the number of retransmissions exceeds a predetermined number, the transmitting and receiving RLC entities may release connection and may perform an RLC entity re-establishment procedure. When the lost data corresponding to RLC SN 2 is successfully received, the receiving RLC entity can move the window lower edge to 4 (1g-45).

Therefore, in the RLC layer, when an RLC SN is lost, a transmission delay occurs until a lost packet arrives, and a serious transmission delay occurs. As described above, the RLC layer guarantees error-free and lossless transmission.

Figure 1H:
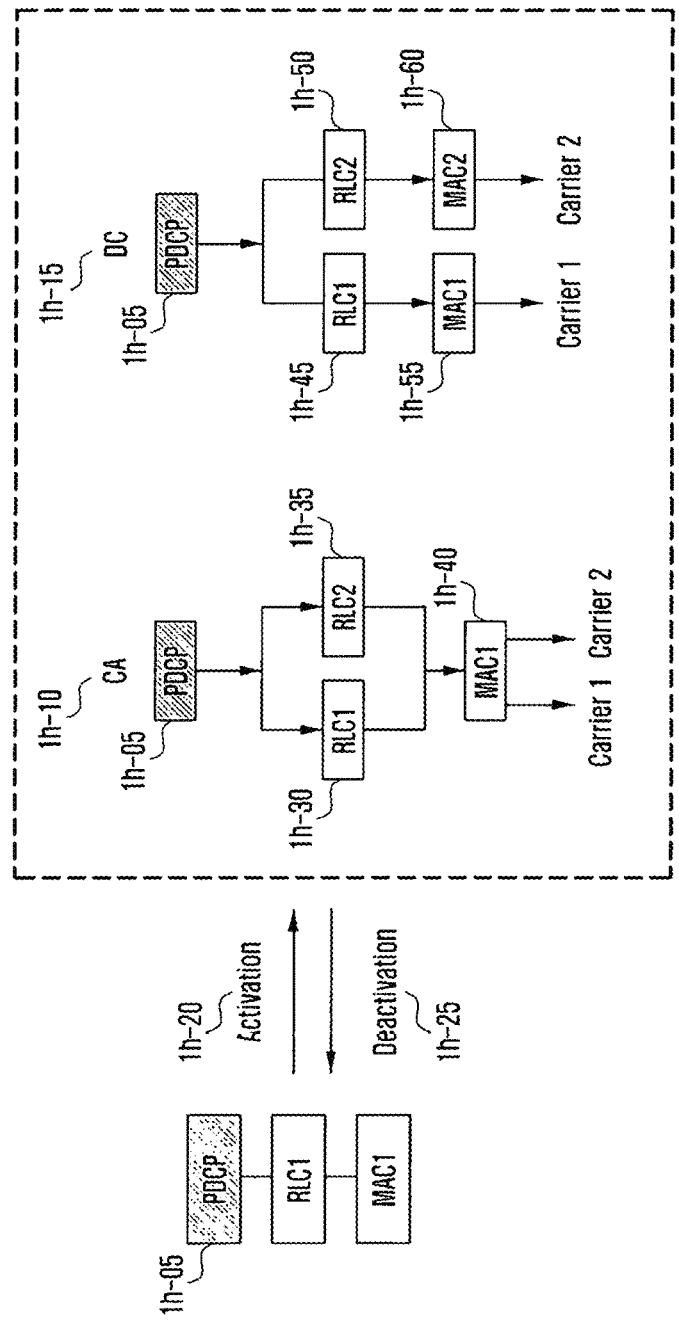
FIG. 1H illustrates packet duplication in which a PDCP layer transmits duplicate packets in a next-generation mobile communication system according to an embodiment of the disclosure.

FIG. 1H illustrates packet duplication in which a PDCP layer transmits duplicate packets in a next-generation mobile communication system according to an embodiment of the disclosure.

Referring to FIG. 1H, a transmitting apparatus (UE or base station) may construct the header of each layer in each layer for data received in a PDCH layer 1h-05, may process the data, and may transmit the data to a lower layer, as illustrated in FIG. 1E. The transmitting apparatus may use carrier aggregation 1h-10 or dual connectivity 1h-15. When the transmitting apparatus uses carrier aggregation or dual connectivity, the transmitting apparatus may activate packet duplication 1h-20.

When packet duplication is activated, the transmitting apparatus sets up one more transmitting RLC entity 1h-35 and 1h-50 connected to one transmitting PDCP layer, and the PDCH layer 1h-05 delivers duplicate data corresponding to one PDCP SN to two transmitting RLC entities 1h-30, 1h-35, 1h-45, and 1h-50. The two transmitting RLC entities may process each of the duplicate packets received from the PDCP-layer entity and may transmit the packets. When carrier aggregation 1h-10 is used, a transmitting MAC-layer entity 1h-40 transmits the duplicate packets received from the different RLC-layer entities 1h-30 and 1h-35 via different frequencies. When dual connectivity 1h-15 is used, transmitting MAC-layer entities 1h-55 and 1h-60 transmit the duplicate packets received from the respective RLC layers 1h-45 and 1h-50 via corresponding frequencies, respectively.

A procedure for activating 1h-20 or deactivating 1h-25 packet duplication is determined by a base station, in which the base station may activate or deactivate packet duplication of each PDCP entity using an MAC control element (CE). Packet duplication may be activated when a transmission link is unstable or when a transmission delay needs to be reduced (e.g., it is necessary to support a service sensitive to a transmission delay). Packet duplication may be deactivated when a transmission link is stable or when a transmission delay does not need to be reduced any more (e.g., when a service sensitive to a transmission delay is not supported).

Figure 1I:
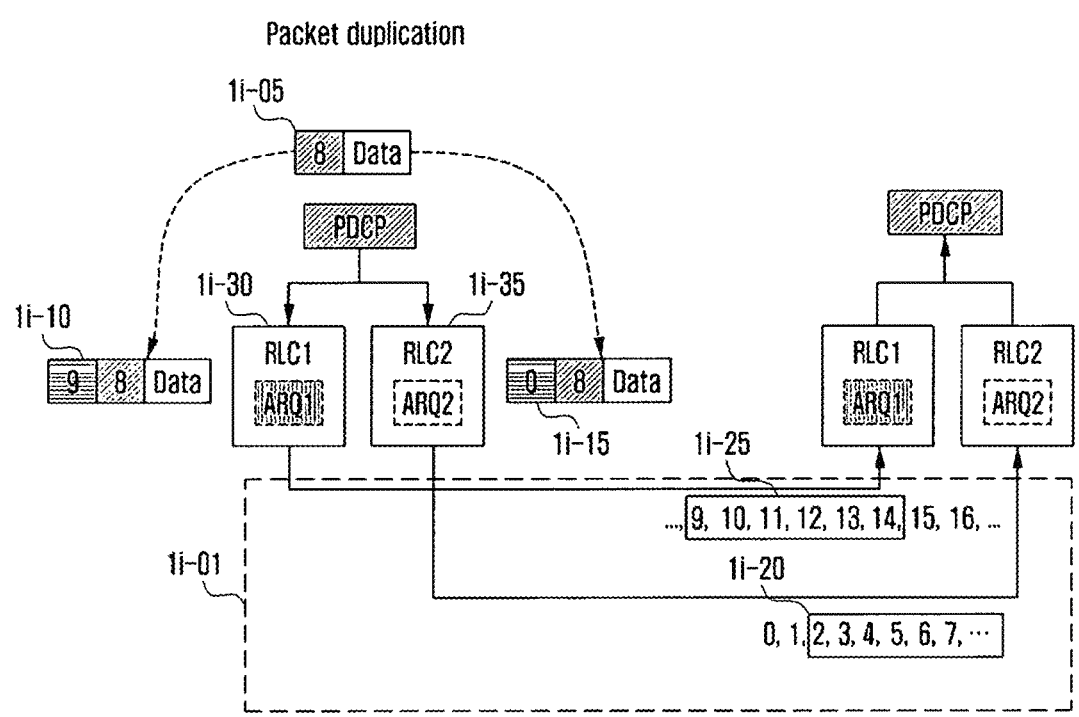
FIG. 1I illustrates a concrete example of packet duplication for a next-generation mobile communication system according to an embodiment of the disclosure.

FIG. 1I illustrates a concrete example of packet duplication for a next-generation mobile communication system according to an embodiment of the disclosure.

Referring to FIG. 1I, each layer can process only the header and data of each layer. FIG. 1I illustrates the processing operations of transmitting and receiving RLC-layer entities, and the operation of a lower layer (that is, an MAC layer or PHY layer) may be performed as illustrated in FIG. 1D or FIG. 1E. In FIG. 1I, the operation of the lower layer (MAC layer or PHY layer) may be indicated by an empty box 1i-01.

In FIG. 1I, when a PDCP-layer entity processes data corresponding to PDCP SN 8, an MAC-layer entity may receive MAC control information instructing that packet duplication be activated.

Then, the MAC-layer entity may indicate the activation instruction, received from the MAC control information, to a corresponding PDCP layer. The PDCP-layer entity may set up an additional RLC entity 1i-35 and may transmit a PDCP PDU 1i-05 corresponding to PDCP SN 8 to each of RLC entities 1i-30 and 1i-35.

A first RLC entity 1i-30 may allocate corresponding RLC SN 9 to an RLC header, may construct an RLC PDU 1i-10, and may transmit the RLC PDU 1i-10 to a lower layer. Upon receiving the PDCP PDU, a second RLC entity 1i-35 may allocate RLC SN 0 to the RLC header, may construct a corresponding RLC PDU 1i-15, and may transmit the RLC PDU 1i-15 to the lower layer. When data corresponding to RLC SN 9 is lost among data transmitted through a first link 1i-25 and data corresponding to RLC SNs 10 and 11 are received, the lower edge of a window may be moved to 9. Then, as described in FIG. 1G, a timer is operated. When the timer expires, retransmission of the data corresponding to RLC SN 9 may be requested.

When data corresponding to RLC SNs 0 and 1 arrive via a second link 1i-20 and data corresponding to RLC SN 2 is lost, the edge of the window may be moved to 2. Then, as described in FIG. 1G, the timer is operated. When the timer expires, retransmission of the data corresponding to RLC SN 2 may be requested.

As described above, packet duplication is performed with an ARQ function implemented independently in different RLC-layer entities. A retransmission request, retransmission, and a window operation are performed independently in each RLC-layer entity.

Therefore, as described in FIG. 1I, when packet duplication is performed with the ARQ function implemented independently in different RLC-layer entities, unnecessary retransmission is requested, transmission resources are wasted, and a transmission delay occurs.

Figure 1J:
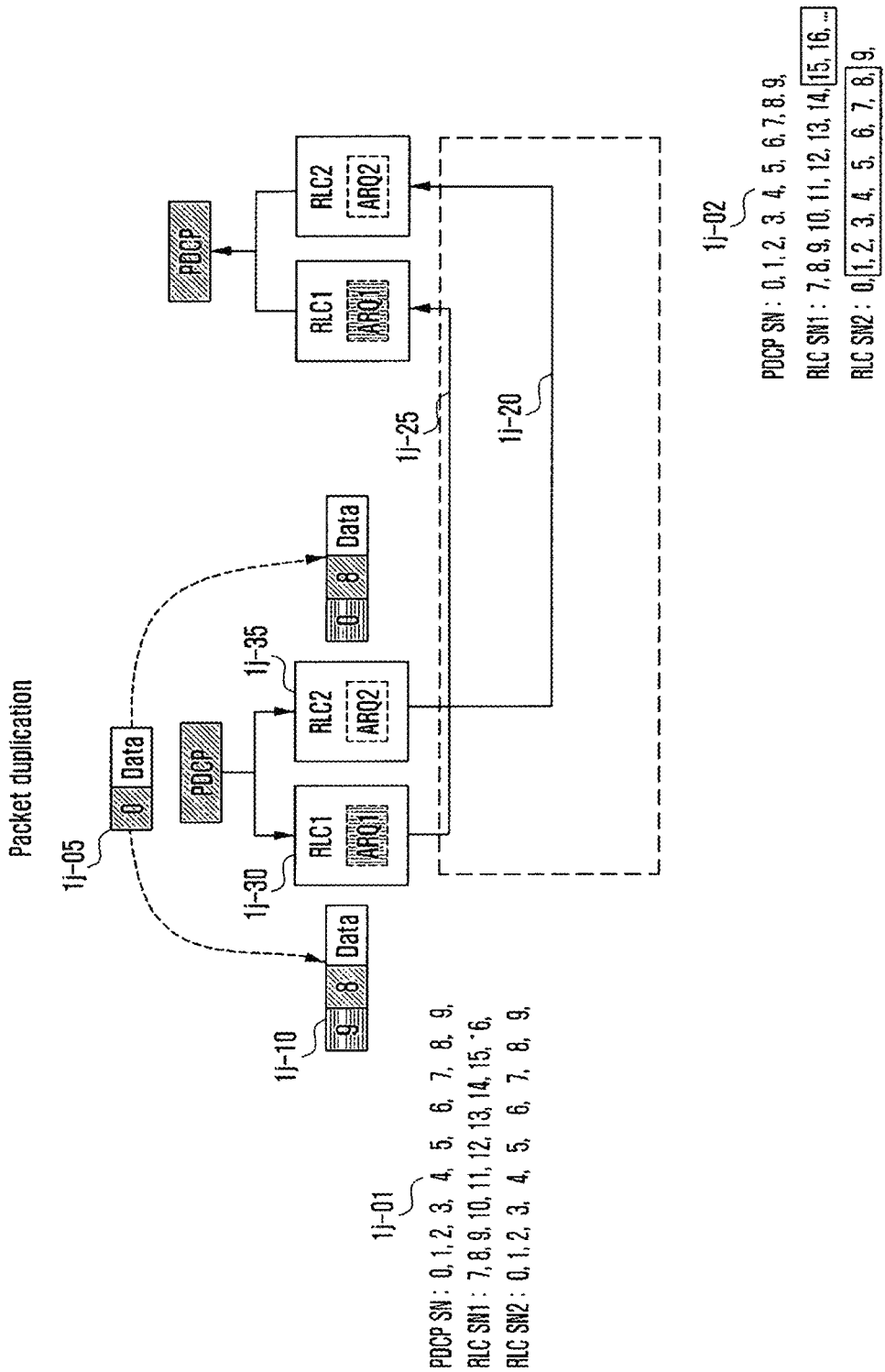
FIG. 1J illustrates a problem that occurs when different RLC layers independently perform an ARQ function in packet duplication according to an embodiment of the disclosure.

FIG. 1J illustrates a problem that occurs when different RLC layers independently perform the ARQ function in packet duplication according to an embodiment of the disclosure.

Referring to FIG. 1J, Table 1 shows a relationship between PDCP SN of transmitted packet and RLC SN allocated by each RLC entity

TABLE 1

| PDCP · SN· | 0· | 1· | 2· | 3· | 4· | 5· | 6· | 7· | 8· | 9· |
|---|---|---|---|---|---|---|---|---|---|---|
| RLC · SN1· | 7· | 8· | 9· | 10· | 11· | 12· | 13· | 14· | 15· | 16· |
| RLC · SN2· | 0· | 1· | 2· | 3· | 4· | 5· | 6· | 7· | 8· | 9· |

In FIG. 1J, when a transmitting MAC-layer entity receives an instruction to activate packet duplication via MAC control information when data corresponding to PDCP SN 0 is processed, the transmitting MAC-layer entity may instruct a corresponding PDCP entity to activate packet duplication. Then, the PDCP entity may transmit duplicate data to each RLC entity, starting from data corresponding to PDCP SN 0.

Table 1 and 1j-01 or 1j-02 of FIG. 1J show the relationship between a PDCP SN and RLC SNs allocated to each packet. It is assumed that a transmitting RLC entity transmits data corresponding to first RLC SNs 7, 8, 9, 10, 11, 12, 13, and 14 via a first link 1*j*-25 and a receiving RLC entity successfully receives all of the data.

In this case, as illustrated in 1*j*-02, a window lower edge for a first receiving RLC entity may be moved to first RLC SN 15.

Further, it is assumed that the transmitting RLC entity transmits data corresponding to second RLC SNs 0, 1, 2, 3, 4, 5, 6, and 7 via a second link 1*j*-20 and data corresponding to second RLC SNs 1, 3, 5, and 7 are lost.

Then, a second receiving RLC entity can move a window lower edge only to second RLC SN 1 and operates a timer. When the timer expires, the second receiving RLC entity performs an RLC status report indicating that the data corresponding to second RLC SNs 1, 3, 5, and 7 are lost via the second link, and a second transmitting RLC entity 1*j*-35 retransmits the data corresponding to second RLC SNs 1, 3, 5, and 7.

However, since a receiving PDCP layer has successfully received all data corresponding to PDCP SNs 0, 1, 2, 3, 4, 5, 6, and 7 (successfully transmitted through the first link), it is unnecessary to retransmit the data corresponding to second RLC SNs 1, 3, 5, and 7 (i.e., data corresponding to PDCP SNs 1, 3, 5, and 7), through the second link. Therefore, unnecessary retransmission is performed, which may cause waste of transmission resources and a transmission delay.

The disclosure proposes a scheme for preventing unnecessary retransmission and waste of transmission resources and reducing a transmission delay in packet duplication of the next-generation mobile communication system described in FIG. 1J.

A first embodiment of efficient transmitting RLC-layer entities of the disclosure for preventing unnecessary retransmission and waste of transmission resources and reducing a transmission delay in packet duplication of the-next generation mobile communication system is as follows.

1. A PDCP-layer entity and two corresponding transmitting RLC-layer entities (first RLC-layer entity and second RLC-layer entity) that perform packet duplication share and maintain a mapping relationship between a PDCP SN, a first RLC SN, and a second RLC SN. A mapping table is constructed, and when successful reception (RLC ACK) with respect to a first RLC SN is verified, it is determined that successful reception with respect to a second RLC SN corresponding to the first RLC SN is achieved. On the other hand, when successful reception (RLC ACK) with respect to the second RLC SN is verified, it is determined that successful reception with respect to the first RLC SN corresponding to the second RLC SN is achieved.

2. When a first receiving RLC-layer entity transmits an RLC status report and requests retransmission with respect to the first RLC SN from the first transmitting RLC-layer entity, the first transmitting RLC-layer entity verifies whether data corresponding to the first RLC SN is successfully transmitted to a second receiving RLC-layer entity by checking the mapping table with respect to the first RLC SN.

A. When the data corresponding to the first RLC SN requested to be retransmitted is not successfully received by the second receiving RLC entity, retransmission with respect to the first RLC SN is performed.

B. When the data corresponding to the first RLC SN requested to be retransmitted is successfully received by the second receiving RLC entity, the first transmitting RLC-layer entity does not retransmit the data corresponding to the first RLC SN as initially transmitted but may construct and transmit an RLC header corresponding to the first RLC SN and data having a predetermined size.

1) The data having the predetermined size may have a size of 0 bytes. That is, a PDCP header having a PDCP SN corresponding to the first RLC SN, an RLC header corresponding to the first RLC SN, and a corresponding MAC header may be constructed, and only the headers may be transmitted. Accordingly, a window for the first receiving RLC entity is not stopped, the lower edge of the window may be moved, and no more retransmission is requested.

2) The data having the predetermined size may be padding data or random data having a small size. That is, the transmitting entity may construct a PDCP header having a PDCP SN corresponding to the first RLC SN, an RLC header corresponding to the first RLC SN, and a corresponding MAC header and may transmit the headers constructed in front of the padding data or random data having the small size. Accordingly, a window for the first receiving RLC entity is not stopped, the lower edge of the window may be moved, and no more retransmission is requested.

3) The data having the predetermined size may be data corresponding to a new PDCP SN. The transmitting entity may construct a PDCP header having the new PDCP SN (PDCP SN not yet transmitted), instead of a PDCP SN corresponding to the first RLC SN, an RLC header corresponding to the first RLC SN, and a corresponding MAC header and may transmit the headers constructed in front of the data corresponding to the new PDCP SN. Accordingly, a window for the first receiving RLC entity is not stopped, the lower edge of the window may be moved, and no more retransmission is requested. Therefore, when the PDCP layer transmits the data corresponding to the new PDCP SN, the RLC layer transmits the header having the first RLC SN, which is retransmitted, at the same time, so that the first receiving RLC layer may operate without any problem.

3. The second transmitting RLC entity may also apply and operate the mapping table and the retransmission procedure in the same manner as the first transmitting RLC entity.

In a summary of the foregoing embodiment, the PDCP-layer entity may set up, on the basis of a PDCP SN, a mapping relationship between the PDCP SN and an RLC SN of the first transmitting RLC-layer entity independently of a mapping relationship between the PDCP SN and an RLC SN of the second transmitting RLC-layer entity. Accordingly, interaction between the first transmitting RLC-layer entity and the second transmitting RLC-layer entity may be discarded. When the first transmitting RLC-layer entity (or the second transmitting RLC-layer entity) identifies an RLC ACK of a received RLC status report and delivers information on an RLC SN relating to the received RLC ACK to the PDCP-layer entity, the PDCP-layer entity may verify a PDCP SN, which is identified via the RLC ACK to be successfully delivered, using the mapping information and may discard corresponding data. In addition, the PDCP-layer entity may indicate to the second transmitting RLC-layer entity (or the first transmitting RLC-layer entity) that the second transmitting RLC-layer entity (or the first transmitting RLC-layer entity) does not need to transmit data corresponding to a PDCP SN, which is identified to be successfully delivered from the first transmitting RLC-layer entity (or the second transmitting RLC-layer entity). Alternatively, the PDCP-layer entity may indicate to the second transmitting RLC-layer entity (or the first transmitting RLC-layer entity) that the second transmitting RLC-layer entity (or the first transmitting RLC-layer entity) needs to discard the data corresponding to the PDCP SN. The PDCP-layer entity may indicate an RLC SN of the second transmitting RLC-layer entity (or the first transmitting RLC-layer entity) corresponding to the PDCP SN using the mapping information and may indicate that the second transmitting RLC-layer entity (or the first transmitting RLC-layer entity) does not need to transmit the data or needs to discard the data. In packet duplication, when successful delivery via one link is identified, unnecessary duplicate transmission via another link may be prevented.

The second transmitting RLC-layer entity (or the first transmitting RLC-layer entity) may construct a PDCP header and an RLC header and may transmit only the headers with respect to the RLC SN indicated by the PDCP-layer entity not to be transmitted or to be discarded, or may transmit new PDCP data PDCP PDU) with a header corresponding to the indicated RLC SN attached, as illustrated in the first embodiment.

Figure 1K:
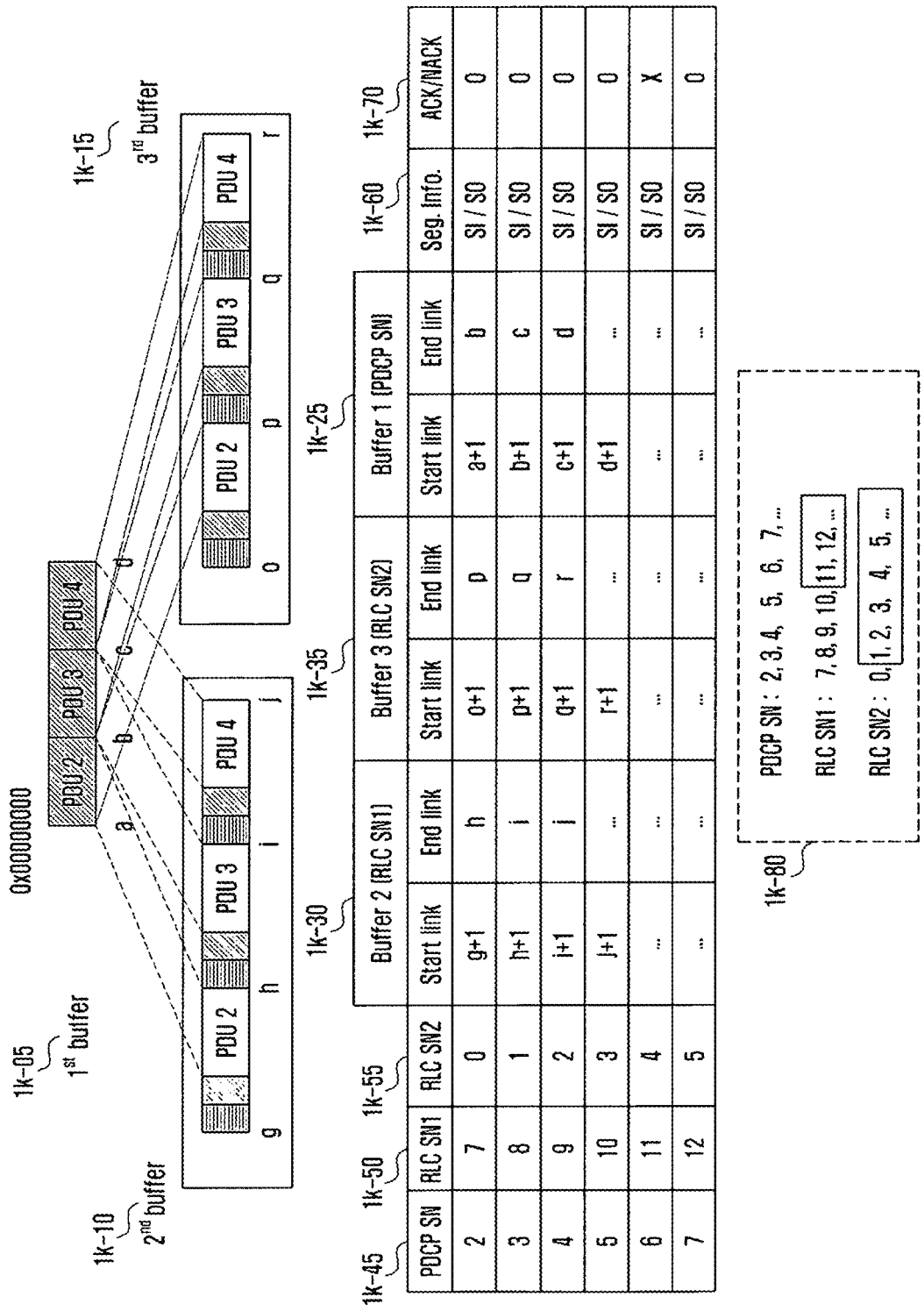
FIG. 1K illustrates a mapping table proposed in a first embodiment that shows the operation of efficient transmitting RLC-layer entities in packet duplication according to an embodiment of the disclosure.

FIG. 1K illustrates a mapping table proposed in the first embodiment that shows the operation of efficient transmitting RLC-layer entities in packet duplication according to the disclosure.

Referring to FIG. 1K, FIG. 1K shows the mapping table illustrating a mapping relationship between the PDCP SN of a transmitting PDCP-layer entity, the first RLC SN of a first RLC-layer entity connected to the transmitting PDCP-layer entity, and the second RLC SN of the second RLC-layer entity connected to the transmitting PDCP-layer entity.

In FIG. 1K, a first buffer 1$k$-05, a second buffer 1$k$-10, and a third buffer 1$k$-15 may be physically the same buffer or different buffers, or only some of which may be different buffers. Further, these buffers may be only logically distinguished buffers.

When an IP packet arrives at the PDCP-layer entity, the PDCP-layer entity may store the IP packet and may construct a PDCP PDU. The first buffer may indicate the address of a memory that stores the IP packets or PDCP PDUs and may record a corresponding memory address in the mapping table as in 1$k$-25. When packet duplication is activated, the PDCP-layer entity may deliver the duplicate PDCP PDUs to the first transmitting RLC entity and the second transmitting RLC entity, respectively.

The second buffer may be a buffer for the first transmitting RLC entity (that stores an RLC PDU including up to an RLC header). When data pre-processing is performed in a next-generation mobile communication system, the second buffer may be a buffer for an MAC layer that stores an MAC subheader including up to an MAC subheader corresponding to the RLC PDU of the first transmitting RLC entity and an MAC SDU. Alternatively, when an RLC header and an MAC subheader are dynamically constructed and transmitted, only the first buffer may be used.

The third buffer may be a buffer for the second transmitting RLC entity (that stores an RLC PDU including up to an RLC header). When data pre-processing is performed in a next-generation mobile communication system, the second buffer may be a buffer for an MAC layer that stores an MAC subheader including up to an MAC subheader corresponding to the RLC PDU of the second transmitting RLC entity and an MAC SDU. Alternatively, when an RLC header and an MAC subheader are dynamically constructed and transmitted, only the first buffer may be used.

When constructing PDCP PDUs by allocating PDCP SNs to 2, 3, 4, 5, 6, and 7 for respective data and constructing a PDCP header, the transmitting PDCP-layer entity may record a corresponding PDCP SN 1$k$-45 and a corresponding memory address 1$k$-25 in the mapping table. Then, the first transmitting RLC entity may allocate first RLC SNs 7, 8, 9, 10, 11, and 12 to the duplicate data received by the PDCP layer, may construct an RLC header, and may record the first RLC SNs 1$k$-50 corresponding to the PDCP SNs and corresponding memory addresses 1$k$-30 in the mapping table. The second transmitting RLC unit may allocate second RLC SNs 0, 1, 2, 3, 4, and 5 to the duplicate data received by the PDCP layer, may construct an RLC header, and may record the second RLC SNs 1$k$-55 corresponding to the PDCP SNs and corresponding memory addresses 1$k$-35 in the mapping table. When each transmitting RLC entity performs segmentation, segmentation information 1$k$-60 may be recorded in the mapping table.

It is assumed that the foregoing mapping table is configured, data corresponding to first RLC SNs 7, 8, 9, 10, 11, and 12 are transmitted via a first link, only the data corresponding to first RLC SN 11 is lost, and the remaining data are successfully delivered to a first receiving RLC entity (1$k$-80). Then, the first receiving RLC entity may transmit an RLC status report indicating that the data corresponding to first RLC SNs 7, 8, 9, and 10 have been successfully received and the data corresponding to first RLC SN 11 has been lost. Upon receiving the RLC status report, the first transmitting RLC entity may record successful delivery in the mapping table according to the RLC status report (1$k$-70).

It is assumed that the foregoing mapping table is configured, data corresponding to second RLC SNs 0, 1, 2, 3, 4, and 5 are transmitted via a second link, only the data corresponding to second RLC SNs 1, 2, and 4 are lost, and the remaining data are successfully delivered to a second receiving RLC entity (1$k$-80). Then, the second receiving RLC entity may transmit an RLC status report indicating that the data corresponding to second RLC SNs 0, 3, and 5 have been successfully received and the data corresponding to second RLC SNs 1, 2, and 4 have been lost. Upon receiving the RLC status report, the second transmitting RLC entity may record successful delivery in the mapping table according to the RLC status report (1$k$-70). The first RLC entity and the second RLC entity may receive the RLC status reports at different times and may perform retransmissions at different times.

When the mapping table is configured as described above, the first transmitting RLC entity and the second transmitting RLC entity may recognize that the data corresponding to PDCP SNs 2, 3, 4, 5, and 7 are successfully transmitted and only the data corresponding to PDCP SN 6 is lost.

The first transmitting RLC entity may check the data corresponding to first RLC SN 11 in the mapping table, and may retransmit the data corresponding to first RLC SN 11 because the successful delivery 1$k$-70 of the data is not confirmed. The second transmitting RLC entity may check the data corresponding to second RLC SNs 1, 2 and 4 in the mapping table. Then, since the successful delivery 1$k$-70 of the data corresponding to second RLC SN 4 is not confirmed, the second transmitting RLC entity may retransmit the data corresponding to second RLC SN 4. However, regarding the data corresponding to second RLC SNs 1 and 2, the mapping table shows that the data corresponding to PDCP SNs 3 and 4, which correspond to the data corresponding to second RLC SNs 1 and 2, have been successfully delivered as first RLC SNs 8 and 9 through the first link.

Therefore, the second transmitting RLC entity may retransmit the data corresponding to second RLC SNs 1 and 2 as follows.

The second transmitting RLC-layer entity does not retransmit the data corresponding to the second RLC SNs as initially transmitted but may construct and transmit an RLC header corresponding to the second RLC SNs and data having a predetermined size.

The data having the predetermined size may have a size of 0 bytes. A PDCP header having a PDCP SN corresponding to the second RLC SNs, an RLC header corresponding to the second RLC SNs, and a corresponding MAC header may be constructed, and only the headers may be transmitted. Accordingly, a window for the second receiving RLC entity is not stopped, the lower edge of the window may be moved, and no more retransmission is requested.

The data having the predetermined size may be padding data or random data having a small size. That is, a PDCP header having a PDCP SN corresponding to the second RLC SNs, an RLC header corresponding to the second RLC SNs, and a corresponding MAC header may be constructed and transmitted in front of the padding data or random data having the small size. Accordingly, a window for the second receiving RLC entity is not stopped, the lower edge of the window may be moved, and no more retransmission is requested.

The data having the predetermined size may be data corresponding to a new PDCP SN. That is, a PDCP header having the new PDCP SN (PDCP SN not yet transmitted, for example, PDCP SN 8), instead of a PDCP SN corresponding to the second RLC SNs, an RLC header corresponding to the second RLC SNs, and a corresponding MAC header may be constructed and transmitted in front of the data corresponding to the new PDCP SN. Accordingly, a window for the second receiving RLC entity is not stopped, the lower edge of the window may be moved, and no more retransmission is requested. Therefore, when the PDCP layer transmits the data corresponding to the new PDCP SN, the RLC layer transmits the header having the second RLC SNs, which is retransmitted, at the same time, so that the second receiving RLC layer may operate without any problem.

Figure 1L:
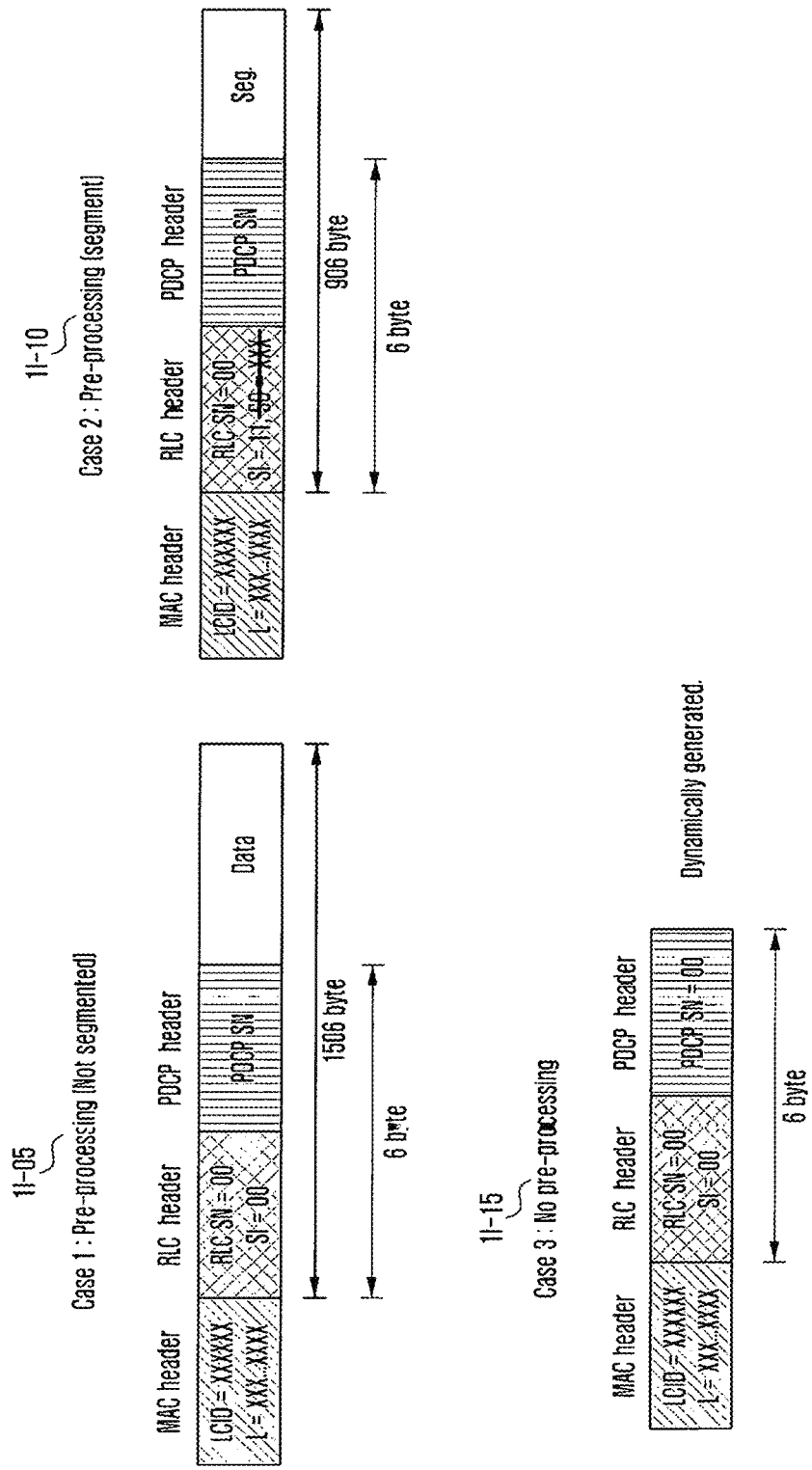
FIG. 1L illustrates a method for constructing data to be transmitted when a second (or first) transmitting RLC layer retransmits data that is identified to be successfully delivered in a first (or second) transmitting RLC layer according to an embodiment of the disclosure.

FIG. 1L illustrates a method for constructing data to be transmitted when a second (or first) transmitting RLC layer retransmits data that is identified to be successfully delivered in a first (or second) transmitting RLC layer according to the disclosure.

Referring to FIG. 1L, FIG. 1L may be divided into the following three cases.

1. When a transmitting entity performs data pre-processing and does not segment data to be retransmitted (1/-05)

A. For an RLC SN to be retransmitted, excluding data initially transmitted, a PDCP header including a corresponding PDCP SN, an RLC header including the RLC SN to be retransmitted, and a corresponding MAC header are constructed. An SI field of the RLC header is set to 00 in order to indicate that an RLC PDU is not segmented. When padding data, random data, or data corresponding to a new PDCP SN is added subsequently, an L field that indicates length of the MAC header indicates a corresponding length. When only the PDCP header, the RLC header, and the MAC header are transmitted, the L field of the MAC header indicates the total length of the RLC header and the PDCP header. Only the PDCP header, the RLC header, and the MAC header, which are constructed as above, may be transmitted. Alternatively, the PDCP header, the RLC header, and the MAC header may be transmitted along with the padding data or random data. Alternatively, the PDCP header, the RLC header, and the MAC header may be transmitted along with the data corresponding to the new PDCP SN.

2. When a transmitting entity performs data pre-processing and segments data to be retransmitted (1/-10)

A. For an RLC SN to be retransmitted, excluding data initially transmitted, a PDCP header including a corresponding PDCP SN, an RLC header including the RLC SN to be retransmitted, and a corresponding MAC header are constructed. Even though an SI field of the RLC header is set to 01, 10, or 11 to indicate segmented information, the SI field needs to be reset to 00 to indicate that an RLC PDU is not segmented. When an SO field is added, the RLC header needs to be constructed by deleting the SO field. When padding data, random data, or data corresponding to a new PDCP SN is added subsequently, an L field (that indicates length) of the MAC header indicates a corresponding length. When only the PDCP header, the RLC header, and the MAC header are transmitted, the L field of the MAC header indicates the total length of the RLC header and the PDCP header. Only the PDCP header, the RLC header, and the MAC header, which are constructed as above, may be transmitted. Alternatively, the PDCP header, the RLC header, and the MAC header may be transmitted along with the padding data or random data. Alternatively, the PDCP header, the RLC header, and the MAC header may be transmitted along with the data corresponding to the new PDCP SN.

3. When a transmitting entity dynamically generates data to be retransmitted without performing data pre-processing (1/-15)

A. For an RLC SN to be retransmitted, excluding data initially transmitted, a PDCP header including a corresponding PDCP SN, an RLC header including the RLC SN to be retransmitted, and a corresponding MAC header are constructed. An SI field of the RLC header is set to 00 in order to indicate that an RLC PDU is not segmented. When padding data, random data, or data corresponding to a new PDCP SN is added subsequently, an L field (that indicates length) of the MAC header indicates a corresponding length. When only the PDCP header, the RLC header, and the MAC header are transmitted, the L field of the MAC header indicates the total length of the RLC header and the PDCP header. Only the PDCP header, the RLC header, and the MAC header, which are constructed as above, may be transmitted. Alternatively, the PDCP header, the RLC header, and the MAC header may be transmitted along with the padding data or random data. Alternatively, the PDCP header, the RLC header, and the MAC header may be transmitted along with the data corresponding to the new PDCP SN.

The first embodiment of the disclosure has proposed and described an efficient transmission method for transmitting RLC-layer entities that perform duplicate packet transmission and retransmission using packet duplication.

The following second embodiment of the disclosure proposes and describes an efficient duplicate packet reception method for receiving RLC layers corresponding to transmitting RLC-layer entities that perform duplicate packet transmission using packet duplication.

The disclosure proposes another scheme for preventing unnecessary retransmission and waste of transmission resources and reducing a transmission delay in packet duplication of the next-generation mobile communication system described in FIG. 1J.

The second embodiment of efficient receiving RLC-layer entities of the disclosure for preventing unnecessary retransmission and waste of transmission resources and reducing a transmission delay in packet duplication of the-next generation mobile communication system is as follows.

1. A receiving PDCP-layer entity and two corresponding receiving RLC-layer entities (first receiving RLC-layer entity and second receiving RLC-layer entity) that receive duplicate packets share and maintain a mapping relationship between a PDCP SN, a first RLC SN, and a second RLC SN. A mapping table is constructed, and when the PDCP-layer entity verifies successful reception with respect to a PDCP SN, the PDCP-layer entity may share a first RLC SN and a second RLC SN, which correspond to the PDCP SN, with the first receiving RLC-layer entity and the second receiving RLC-layer entity. When the PDCP layer verifies that data corresponding to a PDCP SN is successfully received, the PDCP layer may notify the first receiving RLC-layer entity of the first RLC SN corresponding to the PDCP SN or the gap between the PDCP SN and the first RLC SN. Accordingly, even when data corresponding to the first RLC SN is not successfully received, the first receiving RLC-layer entity determines that the data is successfully received (e.g., verifies that the data is successfully received through a second link) and moves a window of the first receiving RLC-layer entity.

The PDCP layer may notify the second receiving RLC-layer entity of the second RLC SN corresponding to the PDCP SN, which is identified to be successfully received, or the gap between the PDCP SN and the second RLC SN. Accordingly, even when data corresponding to the second RLC SN is not successfully received, the second receiving RLC-layer entity determines that the data is successfully received (e.g., verifies that the data is successfully received through a first link) and moves a window of the second receiving RLC-layer entity.

2. When needing to perform an RLC status report, the first (or second) receiving RLC entity operates as follows.

A. Before sending an RLC status report indicating NACK (before reporting the loss) of the first (or second) RLC SN not received (e.g., determined to be lost), the first (or second) receiving RLC entity checks the mapping table and verifies whether the PDCP SN corresponding to the first (or second) RLC SN has been successfully received in the PDCP layer (e.g., verify whether it is indicated that the PDCP SN has been successfully received in the PDCP layer). When the PDCP layer has successfully received the PDCP SN, even though the first (or second) receiving RLC-layer entity does not receive data corresponding to the first (or second) RLC SN corresponding to the PDCP SN, the first (or second) receiving RLC-layer entity sends an RLC status report indicating ACK (e.g., determines that the second (or first) receiving RLC-layer entity receives the data). When the PDCP layer has not received the PDCP SN, the first (or second) receiving RLC-layer entity then indicates the loss of the data using NACK and requests retransmission of the data. Accordingly, it is possible to prevent unnecessary retransmission. When data is not successfully received via the first link but is successfully received via the second link, it is not requested to retransmit the data via the first link, thereby avoiding waste of transmission resources and a transmission delay caused by unnecessary retransmission.

3. The window of the first (or second) receiving RLC entity operates as follows.

A. Upon receiving data from the first or second receiving RLC-layer entity, the PDCP layer checks a mapping relationship between a first or second RLC SN with a corresponding PDCP SN.

B. When determining that data corresponding to the PDCP SN has been successfully received, the PDCP layer notifies the first receiving RLC-layer entity and the second receiving RLC-layer entity of a corresponding first RLC SN and a corresponding second RLC SN or the gap between the first RLC SN and the PDCP SN and the gap between the second RLC SN and the PDCP SN.

C. The first receiving RLC-layer entity determines that the first RLC SN, which is not received by the first receiving RLC entity but is determined to have been successfully received by the second RLC entity, has been received on the basis of the information received from the PDCP layer. In addition, the second receiving RLC-layer entity determines that the second RLC SN, which is not received by the second receiving RLC entity but is determined to have been successfully received by the first RLC entity, has been received on the basis of the information received from the PDCP layer.

D. The first receiving RLC-layer entity and the second receiving RLC-layer entity move the window by reflecting the information received from the PDCP layer. That is, the first receiving RLC-layer entity and the second receiving RLC-layer entity move the lower edge of the window by reflecting the RLC SN considered to have been successfully received in window parameters (e.g., by updating a window parameter RX_NEXT).

FIG. 1M illustrates a mapping table applied in the second embodiment of efficient receiving RLC-layer entities of the disclosure for preventing unnecessary retransmission and waste of transmission resources and reducing a transmission delay in packet duplication of the next-generation mobile communication system.

FIG. 1M shows a mapping table illustrating a mapping relationship between the PDCP SN of a receiving PDCP-layer entity, the first RLC SN of a first receiving RLC-layer entity connected to the transmitting PDCP-layer entity, and the second RLC SN of the second receiving RLC-layer entity connected to the transmitting PDCP-layer entity.

Referring to FIG. 1M, when a PDCP PDU arrives at the PDCP-layer entity, the PDCP-layer entity identifies a PDCP SN and records the PDCP SN in the mapping table (1*m*-05). A receiving entity (UE or base station) may identify a first RLC SN and a second RLC SN corresponding to the PDCP SN and may record the RLC SNs (1*m*-10 and 1*m*-15). The receiving entity (UE or base station) may add a field indicating successful reception (1*m*-20). Whenever receiving a PDCP PDU from the lower first receiving RLC entity or second receiving RLC entity, the PDCP layer identifies a PDCP SN. When it is determined that the PDCP PDU has been successfully received, the PDCP layer may notify the first receiving RLC entity or the second receiving RLC entity of a first RLC SN and a second RLC SN, which correspond to the PDCP SN, or the gap between the first RLC SN and the PDCP SN and the gap between the second RLC SN and the PDCP SN. Then, a mapping table may be configured as in FIG. 1M.

The mapping table may be configured on the basis of the PDCP SN. When data corresponding to the first RLC SN is not received but is received in the second receiving RLC-layer entity, the data may be considered to be received. Successful reception may be determined by verifying the field 1*m*-20. Since RLC SNs sequentially increase, a relationship thereof with a PDCP SN may be derived even though corresponding data is not received.

It is assumed that a transmitting PDCP-layer entity constructs PDCP PDUs by allocating PDCP SNs to 2, 3, 4, 5, 6, and 7 for respective data and constructing a PDCP header, a first transmitting RLC entity allocates first RLC SNs 7, 8, 9, 10, 11, and 12 for the duplicate data received by the PDCP layer and constructs an RLC header, and a second transmitting RLC entity allocates second RLC SNs 0, 1, 2, 3, 4, and 5 for the duplicate data received by the PDCP layer and constructs an RLC header, thereby transmitting the data via a lower layer.

It is assumed that data corresponding to first RLC SNs 7, 8, 9, 10, 11, and 12 are transmitted via a first link, only the data corresponding to first RLC SN 11 is lost, and the remaining data are successfully delivered to the first receiving RLC entity. Then, the first receiving RLC entity may deliver the received data to the upper PDCP layer, and the PDCP-layer entity may determine that the data corresponding to PDCP SNs to 2, 3, 4, 5, and 7 have been successfully received, may configure the mapping table as in 1m-05, and may indicate the mapping table to the first receiving RLC-layer entity. Further, the PDCP-layer entity may record 1m-10 in the mapping table.

It is assumed that the foregoing mapping table is configured, data corresponding to second RLC SNs 0, 1, 2, 3, 4, and 5 are transmitted via a second link, only the data corresponding to second RLC SNs 1, 2, and 4 are lost, and the remaining data are successfully delivered to the second receiving RLC entity. Then, the second receiving RLC entity delivers the data corresponding to second RLC SNs 0, 3, and 5, which have been successfully received, to the upper PDCP layer. The PDCP layer identifies the PDCP SNs, and discards the data, if duplicate. When the data is new data, the PDCP layer may identify the data, may update the mapping table (1m-15), and may indicate the mapping table to the second receiving RLC-layer entity.

When the first receiving RLC entity needs to configure an RLC status report, the first receiving RLC entity may verify that first RLC SN 11 corresponding to PDCP SN 6 is lost by checking the mapping table (or checking information indicated by the PDCP layer) and may indicate via the RLC status report that first RLC SN 11 has been lost and needs to be retransmitted.

When the second receiving RLC entity needs to configure an RLC status report, the second receiving RLC entity may verify that second RLC SN 4 corresponding to PDCP SN 6 is lost by checking the mapping table (or checking information indicated by the PDCP layer) and may indicate via the RLC status report that second RLC SN 4 has been lost and needs to be retransmitted. Further, regarding the data corresponding to second RLC SNs 1 and 2 not received by the second receiving RLC-layer entity, although the second receiving RLC-layer entity has not actually received the data, the mapping table shows (the PDCP layer indicates) that corresponding PDCP SNs 3 and 4 have been successfully received, and the second receiving RLC-layer entity considers that the data have been successfully received and configures an RLC status report indicating ACK.

When the first receiving RLC entity moves the window, the first receiving RLC entity may check the first RLC SN whenever receiving data, and may move the window accordingly. When the PDCP layer indicates the corresponding first RLC SN whenever the PDCP layer receives data from the first receiving RLC entity or the second RLC entity, the first receiving RLC entity may move the window accordingly. The first receiving RLC-layer entity may move the window to 11 (1m-25).

When the second receiving RLC entity moves the window, the second receiving RLC entity may check the second RLC SN whenever receiving data, and may move the window accordingly. When the PDCP layer indicates the corresponding second RLC SN whenever the PDCP layer receives data from the first receiving RLC entity or the second RLC entity, the second receiving RLC entity may move the window accordingly. The second receiving RLC-layer entity may move the window to 4 (1m-25). Even though the second receiving RLC entity has not actually received second RLC SNs 1 and 2, when the PDCP layer has received corresponding PDCP SNs 3 and 4 and indicates that corresponding second RLC SNs 1 and 2 have been successfully received (when the mapping table indicates this), the second receiving RLC entity may the window accordingly. For example, a window parameter (RX_NEXT) corresponding to the lower edge of a receiving window may be updated accordingly.

The windows of the first receiving RLC-layer entity or the second receiving RLC-layer entity may be moved according to first RLC SNs or second RLC SNs corresponding to PDCP SNs successfully received in order without being lost (e.g., moved generally by the RLC SN actually received by each receiving RLC entity). For example, a window parameter (RX_NEXT) corresponding to the lower edge of a receiving window may be updated accordingly.

Figure 1N:
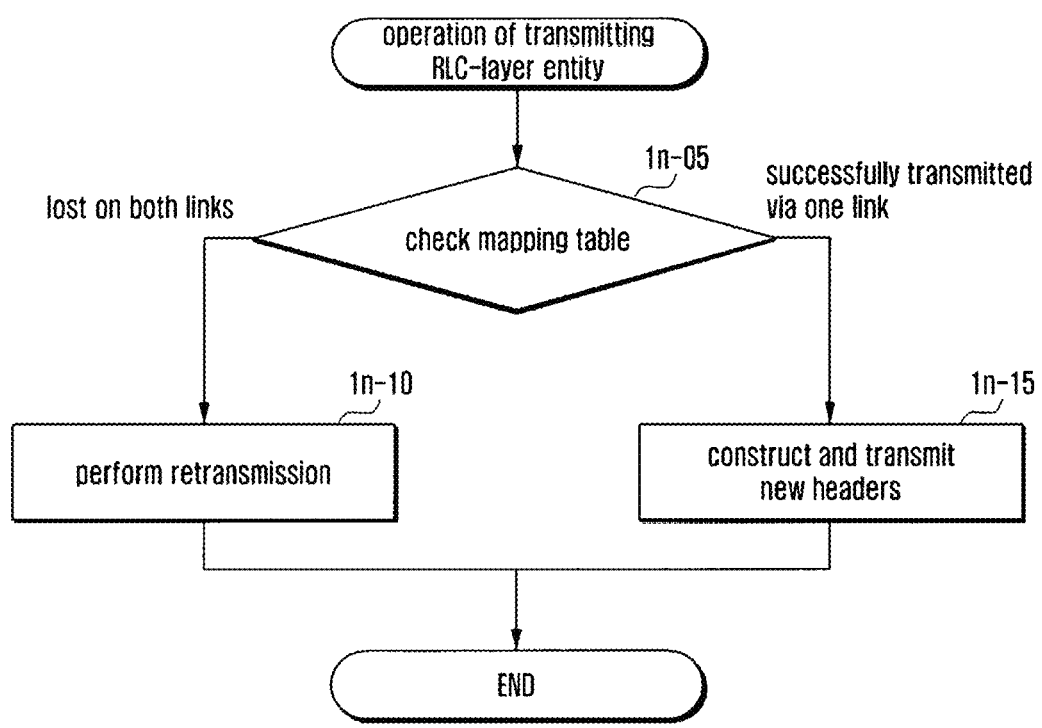
FIG. 1N illustrates the operation of a transmitting RLC-layer entity according to an embodiment of the disclosure.
Figure 10:
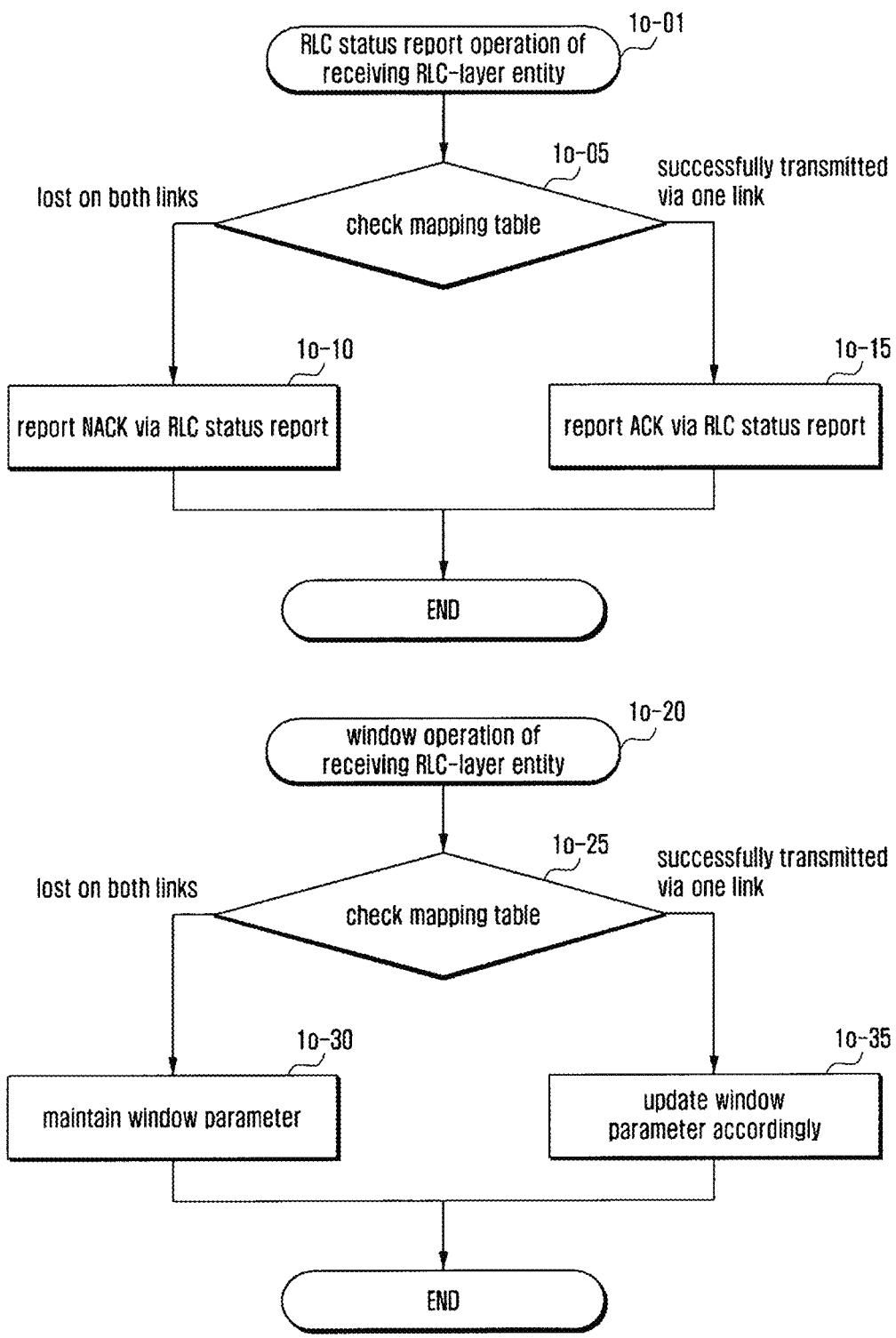

FIG. 1N illustrates the operation of a transmitting RLC-layer entity according to an embodiment of the disclosure.

Referring to FIG. 1N, when retransmission is requested for a specific RLC SN via an RLC status report, the transmitting RLC-layer entity that performs packet duplication first checks a mapping table (1n-05).

When it is determined that a packet is lost via both of two links, the transmitting RLC-layer entity performs retransmission (1n-10).

However, when it is verified that the packet has been successfully delivered via one link, the transmitting RLC-layer entity may construct a PDCP header, an RLC header, and an MAC header and may retransmit only the headers, may retransmit the headers along with padding data or random data having a predetermined size, or may transmit the headers along with a PDCP header corresponding to a new PDCP SN and data (1n-15).

FIG. 1O illustrates the operation of a receiving RLC-layer entity according to an embodiment of the disclosure.

Referring to FIG. 1O, when the receiving RLC-layer entity needs to perform an RLC status report to transmitting RLC-layer entities that perform packet duplication (1o-01), the receiving RLC-layer entity first checks a mapping table (after checking an indication received from a PDCP layer) (1o-05).

When it is determined that a packet is lost via both of two links, the receiving RLC-layer entity transmits an NACK with respect to a lost RLC SN and requests retransmission (1o-10). However, when it is verified that the packet has been successfully delivered via one link, the receiving RLC-layer entity transmits an ACK to prevent unnecessary retransmission although not actually receiving the packet (1o-15).

Hereinafter, the window operation of a receiving RLC-layer entity (1o-20) is described.

In FIG. 1O, when the receiving RLC-layer entity gets an indication of or receives an RLC SN corresponding to a PDCP SN that is determined to have been successfully received from a PDCP layer or the gap between the RLC SN and the PDCP SN from transmitting RLC-layer entities that perform packet duplication, the receiving RLC-layer entity may check a mapping table (after checking an indication received from the PDCP layer) (1o-25). When it is determined that a packet is lost via all of two links, the receiving RLC-layer entity may not update a window parameter with respect to a lost RLC SN (1o-30).

However, when it is verified that the packet has been successfully delivered via one link, the receiving RLC-layer entity updates a window parameter according to an RLC SN successfully delivered via the link and moves a window (1o-35).

In the disclosure, when receiving an indication of packet duplication deactivation through MAC control information, two transmitting RLC entities for packet duplication may perform one of the following procedures using mapping table information described in the first embodiment.

1. A transmitting RLC entity generated for packet duplication stops transmission and empties all data ready for transmission. A transmitting RLC entity that is not a transmitting RLC entity generated for packet duplication continues transmission.

2. A transmitting RLC entity generated for packet duplication transmits only RLC SNs other than an RLC SN verified to have been successfully received by a different RLC entity (only data ready for packet duplication). A transmitting RLC entity that is not a transmitting RLC entity generated for packet duplication continues transmission.

3. A transmitting RLC entity generated for packet duplication transmits data corresponding to an RLC SN verified to have been successfully received by a different RLC entity according to the first embodiment and performs normal transmission with respect to RLC SNs other than the RLC SN (only data ready for packet duplication). A transmitting RLC entity that is not a transmitting RLC entity generated for packet duplication continues transmission.

In the disclosure, when receiving an indication of packet duplication deactivation through MAC control information, two receiving RLC entities for packet duplication may perform one of the following procedures.

1. A receiving RLC-layer entity processes data received so far by the RLC-layer entity (receiving RLC-layer entity configured for packet duplication) or data currently being received and processed in an MAC layer and delivers the data to an upper layer.

2. A receiving RLC-layer entity stops processing data received so far by the RLC-layer entity (receiving RLC-layer entity configured for packet duplication) or data currently being received and processed in an MAC layer and discards the data.

In the first embodiment of the disclosure, RLC-layer entities may verify information on a successfully received RLC SN through an RLC status report and may transmit the information to an upper layer (PDCP layer). In the second embodiment of the disclosure, RLC-layer entities may transmit information on a successfully received RLC SN to an upper layer (PDCP layer).

In the first embodiment or the second embodiment of the disclosure, upon receiving the verified information indicating successful reception from a lower layer (RLC layer), the PDCP layer may transmit the information to another lower layer (RLC layer).

Figure 1P:
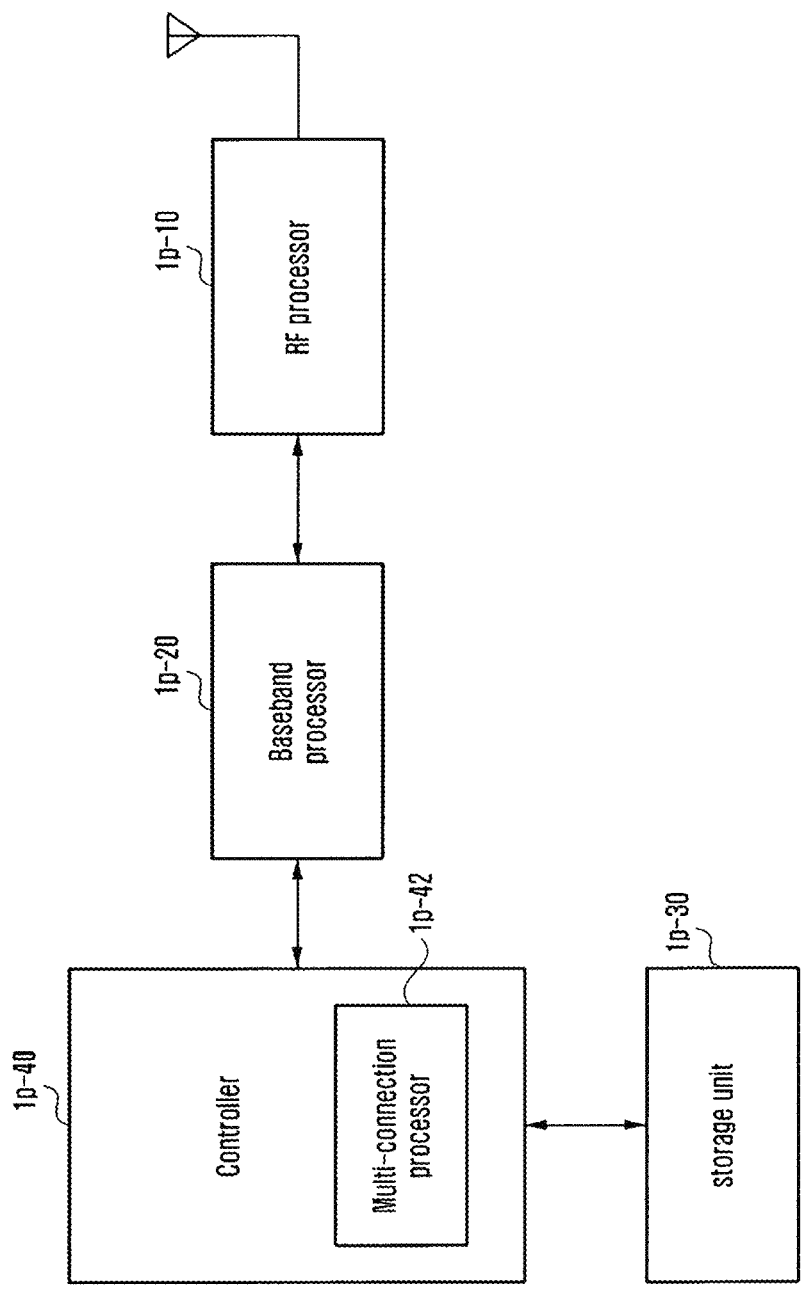
FIG. 1P illustrates the configuration of a UE according to an embodiment of the disclosure.

FIG. 1P illustrates the configuration of a UE according to an embodiment of the disclosure.

Referring to FIG. 1P, the UE includes a radio frequency (RF) processor 1p-10, a baseband processor 1p-20, a storage unit 1p-30, and a controller 1p-40.

The RF processor 1p-10 performs a function for transmitting or receiving a signal through a wireless channel, such as band conversion and amplification of a signal. The RF processor 1p-10 upconverts a baseband signal, provided from the baseband processor 1p-20, into an RF band signal to transmit the RF band signal through an antenna and downconverts an RF band signal, received through the antenna, into a baseband signal. For example, the RF processor 1p-10 may include a transmission filter, a reception filter, an amplifier, a mixer, an oscillator, a digital-to-analog converter (DAC), and an analog-to-digital converter (ADC). Although FIG. 1P shows only one antenna, the UE may include a plurality of antennas. In addition, the RF processor 1p-10 may include a plurality of RF chains. Further, the RF processor 1p-10 may perform beamforming. For beamforming, the RF processor 1p-10 may adjust the phase and strength of each of signals transmitted and received through a plurality of antennas or antenna elements. The RF processor may perform MIMO and may receive a plurality of layers when performing MIMO. The RF processor 1p-10 may perform reception beam sweeping by appropriately setting the plurality of antennas or antenna elements under the control of the controller, or may adjust the orientation and width of a reception beam such that the reception beam is coordinated with a transmission beam.

The baseband processor 1p-20 converts a baseband signal and a bit stream according to the physical-layer specification of a system. For example, in data transmission, the baseband processor 1p-20 encodes and modulates a transmission bit stream, thereby generating complex symbols. In data reception, the baseband processor 1p-20 demodulates and decodes a baseband signal, provided from the RF processor 1p-10, thereby reconstructing a reception bit stream. For example, according to OFDM, in data transmission, the baseband processor 1p-20 generates complex symbols by encoding and modulating a transmission bit stream, maps the complex symbols to subcarriers, and constructs OFDM symbols through inverse fast Fourier transform (IFFT) and cyclic prefix (CP) insertion. In data reception, the baseband processor 1p-20 divides a baseband signal, provided from the RF processor 1p-10, into OFDM symbols, reconstructs signals mapped to subcarriers through fast Fourier transform (FFT), and reconstructs a reception bit stream through demodulation and decoding.

As described above, the baseband processor 1p-20 and the RF processor 1p-10 transmit and receive signals. Accordingly, the baseband processor 1p-20 and the RF processor 1p-10 may be referred to as a transmitter, a receiver, a transceiver, or a communication unit. At least one of the baseband processor 1p-20 and the RF processor 1p-10 may include a plurality of communication modules to support a plurality of different radio access technologies. Further, at least one of the baseband processor 1p-20 and the RF processor 1p-10 may include different communication modules for processing signals in different frequency bands. For example, the different radio access technologies may include an LTE network, an NR network, and the like. In addition, the different frequency bands may include a super high frequency (SHF) band (for example, 2.5 GHz and 5 GHz) and a millimeter wave band (for example, 60 GHz).

The storage unit 1p-30 stores data, such as a default program, an application, and configuration information for operating the UE. The storage unit 1p-30 provides stored data upon request from the controller 1p-40.

The controller 1p-40 controls overall operations of the UE. For example, the controller 1p-40 transmits and receives signals through the baseband processor 1p-20 and the RF processor 1p-10. Further, the controller 1p-40 records and reads data in the storage unit 1p-30. To this end, the controller 1p-40 may include at least one processor. For example, the controller 1p-40 may include a communication processor (CP) to perform control for communication and an application processor (AP) to control an upper layer, such as an application. The controller 1p-40 may include a multi-connection processor 1p-42 to perform processing for an operation in a multi-connection mode.

Figure 1Q:
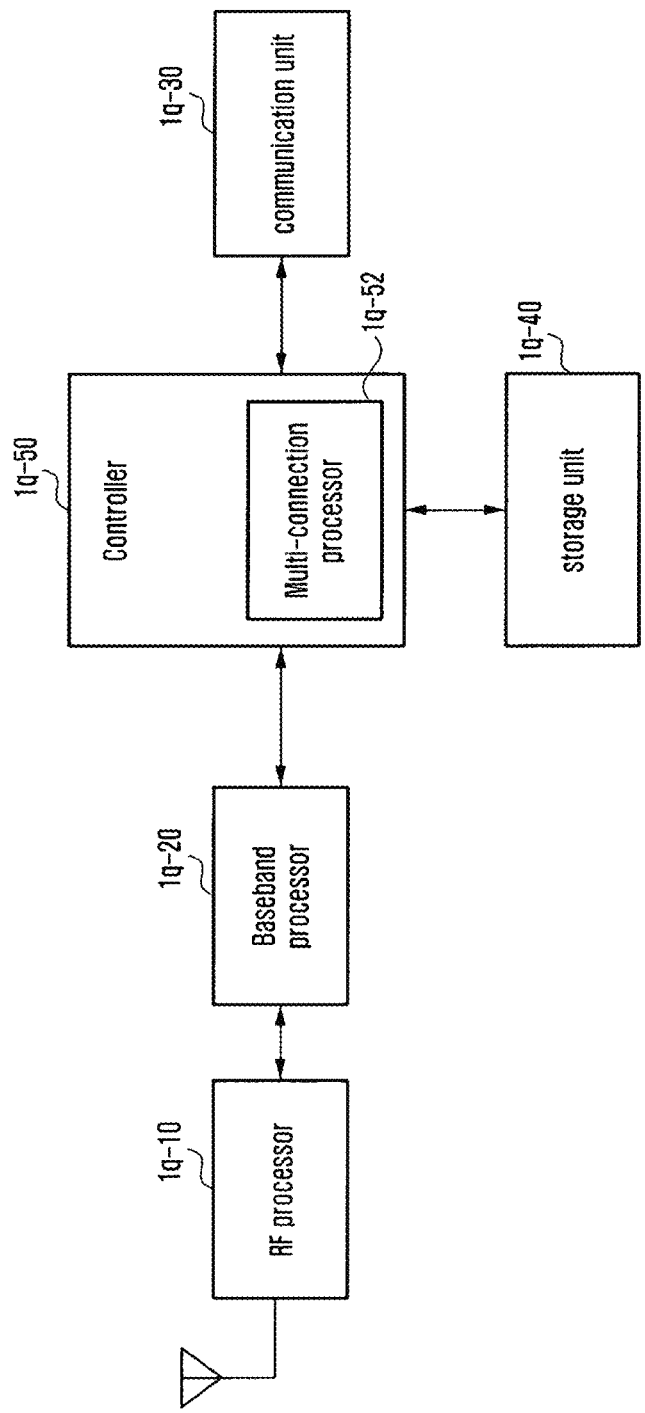
FIG. 1Q illustrates the configuration of a base station in a wireless communication system according to an embodiment of the disclosure.

FIG. 1Q illustrates the configuration of a base station in a wireless communication system according to an embodiment of the disclosure.

Referring to FIG. 1Q, the base station includes an RF processor 1q-10, a baseband processor 1q-20, a backhaul communication unit 1q-30, a storage unit 1q-40, and a controller 1q-50.

The RF processor 1q-10 performs a function for transmitting or receiving a signal through a wireless channel, such as band conversion and amplification of a signal. That is, the RF processor 1q-10 upconverts a baseband signal, provided from the baseband processor 1q-20, into an RF band signal to transmit the RF band signal through an antenna and downconverts an RF band signal, received through the antenna, into a baseband signal. For example, the RF processor 1q-10 may include a transmission filter, a reception filter, an amplifier, a mixer, an oscillator, a DAC, and an ADC. Although FIG. 1Q shows only one antenna, the base station may include a plurality of antennas. In addition, the RF processor 1q-10 may include a plurality of RF chains. Further, the RF processor 1q-10 may perform beamforming. For beamforming, the RF processor 1q-10 may adjust the phase and strength of each of signals transmitted and received through a plurality of antennas or antenna elements. The RF processor may transmit one or more layers, thereby performing downlink MIMO.

The baseband processor 1q-20 converts a baseband signal and a bit stream according to the physical-layer specification of a first radio access technology. For example, in data transmission, the baseband processor 1q-20 encodes and modulates a transmission bit stream, thereby generating complex symbols. In data reception, the baseband processor 1q-20 demodulates and decodes a baseband signal, provided from the RF processor 1q-10, thereby reconstructing a reception bit stream. For example, according to OFDM, in data transmission, the baseband processor 1q-20 generates complex symbols by encoding and modulating a transmission bit stream, maps the complex symbols to subcarriers, and constructs OFDM symbols through IFFT and CP insertion. In data reception, the baseband processor 1q-20 divides a baseband signal, provided from the RF processor 1q-10, into OFDM symbols, reconstructs signals mapped to subcarriers through FFT, and reconstructs a reception bit stream through demodulation and decoding. As described above, the baseband processor 1q-20 and the RF processor 1q-10 transmit and receive signals. Accordingly, the baseband processor 1q-20 and the RF processor 1q-10 may be referred to as a transmitter, a receiver, a transceiver, a communication unit, or a wireless communication unit.

The communication unit 1q-30 provides an interface for performing communication with other nodes in a network.

The storage unit 1q-40 stores data, such as a default program, an application, and configuration information for operating the base station. In particular, the storage unit 1q-40 may store information on a bearer allocated to a connected UE, a measurement result reported from a connected UE, and the like. In addition, the storage unit 1q-40 may store information as a criterion for determining whether to provide or stop a multi-connection to a UE. The storage unit 1q-40 provides stored data upon request from the controller 1q-50.

The controller 1q-50 controls overall operations of the base station. For example, the controller 1q-50 transmits and receives signals through the baseband processor 1q-20 and the RF processor 1q-10 or through the backhaul communication unit 1q-30. Further, the controller 1q-50 records and reads data in the storage unit 1q-40. To this end, the controller 1q-50 may include at least one processor. The controller 1q-50 may include a multi-connection processor 1q-52 to perform processing for an operation in a multi-connection mode.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will understood by those skilled in the art that various changes in form and details may be made therein without departing from the spirit and scope of the disclosure defined by the appended claims and equivalents.

What is claimed is:

1. A packet processing method of a transmitting device including a packet data convergence protocol (PDCP) entity, a first radio link control (RLC) entity, a second RLC entity, and a medium access control (MAC) entity in a wireless communication system, the method comprising:
    delivering, by the PDCP entity to the first RLC entity, a first PDCP protocol data unit (PDU) to be transmitted to a receiving device;
    delivering, by the PDCP entity to the second RLC entity, a second PDCP PDU to be transmitted to the receiving device, the first PDCP PDU and the second PDCP PDU being associated with a packet duplication;
    obtaining, by the PDCP entity from the first RLC entity which has received a positive acknowledge associated with the first PDCP PDU transmitted to the receiving device, first information indicating successful delivery of the first PDCP PDU; and
    delivering, by the PDCP entity to the second RLC entity, second information indicating a discard of the second PDCP PDU based on the first information,
    wherein a RLC service data unit (SDU) corresponding to the second PDCP PDU is discarded based on the second information, by the second RLC entity, in case that at least one RLC PDU from the RLC SDU corresponding to the second PDCP PDU has been generated, and neither the RLC SDU nor a segment thereof has been delivered from the second RLC entity to the MAC entity.

2. The method of claim 1, further comprising:
    obtaining, by the PDCP entity from the second RLC entity which has received a positive acknowledge associated with the second PDCP PDU transmitted to the receiving device, third information indicating successful delivery of the second PDCP PDU, in case that a negative acknowledge associated with the first PDCP PDU is received after delivering the first PDCP PDU to the first RLC entity; and
    delivering, by the PDCP entity to the first RLC entity, fourth information indicating a discard of the first PDCP PDU based on the third information,
    wherein a RLC SDU corresponding to the first PDCP PDU is discarded based on the fourth information, by the first RLC entity, in case that at least one RLC PDU from the RLC SDU corresponding to the first PDCP PDU has been generated, and neither the RLC SDU nor a segment thereof has been delivered from the first RLC entity to the MAC entity.

3. The method of claim 2,
wherein a first RLC PDU is generated, by the first RLC entity, using a third PDCP PDU based on an RLC sequence number associated with the first RLC SDU indicated as not received by the receiving device, in case that the positive acknowledge for the second PDCP PDU is received, and
wherein the generated first RLC PDU is transmitted to the receiving device through the first RLC entity.

4. The method of claim 1,
wherein a mapping table associated with a transmission of the first PDCP PDU or the second PDCP PDU is updated.

5. A transmitting device including a packet data convergence protocol (PDCP) entity, a first radio link control (RLC) entity, a second RLC entity, and a medium access control (MAC) entity in a wireless communication system, the transmitting device configured to:
deliver, by the PDCP entity to the first RLC entity, a first PDCP protocol data unit (PDU) to be transmitted to a receiving device,
deliver, by the PDCP entity to the second RLC entity, a second PDCP PDU to be transmitted to the receiving device, the first PDCP PDU and the second PDCP PDU being associated with a packet duplication,
obtain, by the PDCP entity from the first RLC entity which has received a positive acknowledge associated with the first PDCP PDU transmitted to the receiving device, first information indicating successful delivery of the first PDCP PDU, and
deliver, by the PDCP entity to the second RLC entity, second information indicating a discard of the second PDCP PDU based on the first information,
wherein a RLC service data unit (SDU) corresponding to the second PDCP PDU is discarded based on the second information, by the second RLC entity, in case that at least one RLC PDU from the RLC SDU corresponding to the second PDCP PDU has been generated, and neither the RLC SDU nor a segment thereof has been delivered from the second RLC entity to the MAC entity.

6. The transmitting device of claim 5, further configured to:
obtain, by the PDCP entity from the second RLC entity which has received a positive acknowledge associated with the second PDCP PDU transmitted to the receiving device, third information indicating successful delivery of the second PDCP PDU, in case that a negative acknowledge associated with the first PDCP PDU is received after delivering the first PDCP PDU to the first RLC entity, and
deliver, by the PDCP entity to the first RLC entity, fourth information indicating a discard of the first PDCP PDU based on the third information,
wherein a RLC SDU corresponding to the first PDCP PDU is discarded based on the fourth information, by the first RLC entity, in case that at least one RLC PDU from the RLC SDU corresponding to the first PDCP PDU has been generated, and neither the RLC SDU nor a segment thereof has been delivered from the first RLC entity to the MAC entity.

7. The transmitting device of claim 6,
wherein a first RLC PDU is generated, by the first RLC entity, using a third PDCP PDU based on an RLC sequence number associated with the first PDCP PDU indicated as not received by the receiving device, in case that the positive acknowledge for the second PDCP PDU is received, and
wherein the generated first RLC PDU is transmitted to the receiving device through the first RLC entity.

8. The transmitting device of claim 5,
wherein a mapping table associated with a transmission of the first PDCP PDU or the second PDCP PDU is updated.

9. The method of claim 2,
wherein a first RLC PDU is generated, by the first RLC entity, based on an RLC sequence number associated with the first PDCP PDU indicated as not received by the receiving device and the first PDCP PDU indicated as not received by the receiving device in case that the positive acknowledge for the second RLC SDU is received, and
wherein the generated first RLC PDU is transmitted to the receiving device, through the first RLC entity.

10. The transmitting device of claim 6,
wherein a first RLC PDU is generated, by the first RLC entity, based on an RLC sequence number associated with the first PDCP PDU indicated as not received by the receiving device and the first PDCP PDU indicated as not received by the receiving device in case that the positive acknowledge for the second RLC SDU is received, and
wherein the generated first RLC PDU is transmitted to the receiving device, through the first RLC entity.

* * * * *